(12) United States Patent
Rekimoto et al.

(10) Patent No.: US 7,139,796 B2
(45) Date of Patent: Nov. 21, 2006

(54) METHOD AND SYSTEM FOR SUPPORTING IMAGE CREATING AND STORING OF THE SAME

(75) Inventors: Junichi Rekimoto, Tokyo (JP); Hiroaki Tobita, Tokyo (JP); Hidenori Karasawa, Tokyo (JP)

(73) Assignee: Sony Corporation, Tokyo (JP)

( * ) Notice: Subject to any disclaimer, the term of this patent is extended or adjusted under 35 U.S.C. 154(b) by 670 days.

(21) Appl. No.: 09/947,502

(22) Filed: Sep. 6, 2001

(65) Prior Publication Data
US 2002/0052918 A1 May 2, 2002

(30) Foreign Application Priority Data
Sep. 7, 2000 (JP) .............................. 2000-271355

(51) Int. Cl.
G06F 15/16 (2006.01)
G06F 17/00 (2006.01)
G01S 5/02 (2006.01)

(52) U.S. Cl. .................... 709/204; 715/757; 345/419
(58) Field of Classification Search ............... 709/204; 715/757; 370/260; 345/419–427
See application file for complete search history.

(56) References Cited

U.S. PATENT DOCUMENTS 5,491,743 A * 2/1996 Shiio et al. .................. 709/204
5,659,691 A * 8/1997 Durward et al. ............. 715/757
5,956,028 A * 9/1999 Matsui et al. ................ 715/757
6,476,830 B1 * 11/2002 Farmer et al. ............... 715/769
6,820,112 B1 * 11/2004 Matsuda et al. ............. 709/203

FOREIGN PATENT DOCUMENTS

| JP | 09-081781 | 3/1997 |
|----|-----------|--------|
| JP | 10-328416 | 12/1998 |
| JP | 11-203009 | 7/1999 |
| JP | 2002-024860 | 1/2002 |

OTHER PUBLICATIONS

Nikkei Electronics, 1996 9.9 (No. 670) pp. 151-159.

* cited by examiner

*Primary Examiner*—Rupal Dharia
*Assistant Examiner*—Chirag R. Patel
(74) *Attorney, Agent, or Firm*—Finnegan, Henderson, Farabow, Garrett & Dunner, L.L.P.

(57) ABSTRACT

At least a part of the three-dimensional community space is divided into regions and the right to use a region is sold at a particular price to a user who wants to obtain it. A user having the right to use a region is allowed to build an element such as a building or a signboard in the region via an avatar. If an attractive signboard with high originally is built, the region in which the signboard is built and also nearby regions become popular. As a result, the economic value of such a region becomes high. If desired, a user is allowed to resell his/her region via auction.

26 Claims, 16 Drawing Sheets

SIGNBOARD   AVATAR

INITIAL IMAGE EDITING SCREEN (7) THE CANVAS IS REMOVED

ZONE OWNED BY
ANOTHER PARTICIPANT

ZONE OWNED BY A USER

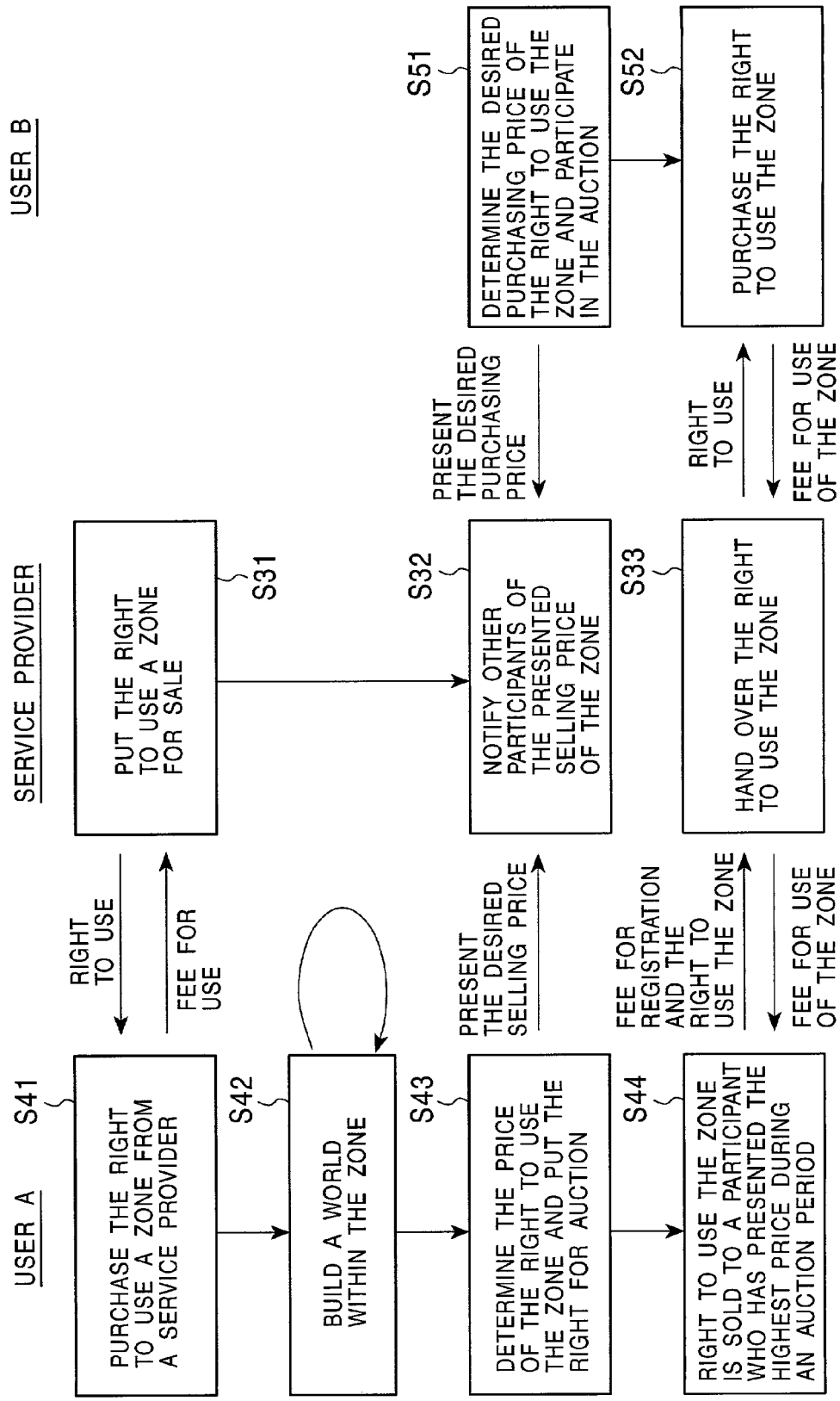

METHOD AND SYSTEM FOR SUPPORTING IMAGE CREATING AND STORING OF THE SAME

BACKGROUND OF THE INVENTION

1. Field of the Invention

The present invention relates to a system and method for supporting a virtual conversation via a computer network such as the Internet such that a plurality of users are allowed to participate therein, and more particularly, to a system and method for supporting a virtual conversation which is performed in a virtual community having a certain space built on a computer network and in which a plurality of users are allowed to participate.

More specifically, the present invention relates to a system and method for supporting a virtual conversation in a virtual community space in which a plurality of participating users are allowed to freely build the whole of or a part of the virtual community space, and in particular, to a system and method for supporting a virtual conversation in a virtual community space in which each participating user is allowed to add an element to the virtual community space and also allowed to change or modify an existing element.

2. Description of the Related Art

Great advances have been made in computing technology, information processing technology, and information transmission technology, and computer systems are now widely used. Network computing technology for connecting computers to each other has become increasingly important. If computers are connected to one another via a network, users of the respective computers are allowed to share information and computer resources, and it becomes possible to easily distribute, transmit, and exchange information. It also becomes possible to execute a process in cooperation with a plurality of computers connected to each other via the network.

Various manners of connecting computers via a network are known. For example, a network called a LAN (Local Area Network) such as Ethernet or a token ring is used to connect computers in a local area, and a WAN (Wide Area Network) is used to connect LANs to each other. Another example is the Internet 10 which has grown to a huge scale via mutual connections among a large number of networks.

On the Internet, various services such as WWW (World Wide Web), News, TELNET (TELetype NETwork), FTP (File Transfer Protocol), and Gopher are available. WWW is a worldwide retrieval system which provides information space having a hyperlink structure, and WWW has made a large contribution to the rapid growth and proliferation of the Internet. In addition to WWW, various applications such as a BBS (Bulletin Board System), and chat are also available on the Internet.

The BBS is a system in which computerized bulletin information is stored in a server on a network and users are allowed to access the information via the network. The advantage of the BBS is that various kinds of information can be managed in a centralized fashion by the server and information can be transmitted in real time among users at various locations in a very wide area.

The chat is a real-time on-line talk made among users via a network, by inputting characters via a keyboard. In general, a plurality of users log in a chat to enjoy conversations in which a statement made by one user is displayed on the monitor screen of each participant. The chat allows users at various distant locations to enjoy real-time conversations or discussions in a virtual world built on the Internet. An attractive advantage of the chat system is that any user can participate in a chat simply by logging in the virtual world provided by the chat system and they are not necessarily needed to be acquaintances to each other in the real world. In the chat, in contrast to the BBS in which interactions are performed in an asynchronous fashion, interactions are performed in a synchronous fashion. The chat is exciting in that a user can immediately receive a response from another user and can input a next sentence depending upon the received response.

In a recent system, a community (virtual city) is built on a computer network, and each user operates his/her own avatar (derived from an incarnation of a Hindu deity) which behaves as the incarnation of the user in the virtual community whereby logging-in users can enjoy the chat via the avatars.

VRML (Virtual Reality Modeling Language) has been developed by expanding WWW to describe three-dimensional information and make hypertext links to objects drawn in three-dimensional graphics. The VRML allows the appearance of a three-dimensional object (or the manner in which the object is illuminated with light) and the geometry of the object to be dealt with as data. Furthermore, a name may be assigned to an object, and the operation of the object to which the name has been assigned may be described in a programming language called Java.

In VRML 1.0, it is possible to describe a three-dimensional object in a static fashion such that the object changes in response to an operation of a mouse performed by a user. On the other hand, the specifications of the VRML 2.0 are based on the "Moving World", and the VRML 2.0 provides, in addition to functions provided by VRML 1.0, various functions which allow a three-dimensional object to behave autonomously, an animation to be mapped, audio data to be dealt with, and an interactive expression to be achieved.

A three-dimensional virtual community space which may be shared by a plurality of users can be described in VRML. A three-dimensional chat is available in which user can enjoy conversations in a three-dimensional virtual community space. The three-dimensional chat makes it possible for users to communicate with each other in a virtual but realistic community built on the Internet.

A three-dimensional virtual space described in VRML may be downloaded from, for example, a WWW server via the Internet. An avatar is assigned to each user who has logged in the virtual community space. The avatar is one of application objects generated by an application. Information (such as a current location, clothes, name, or sex) about each avatar in the virtual community space is supplied to all logging-in users and avatars of the respective users are displayed on the monitor screen of each user. Each user can visit desired locations within the virtual community space via his/her avatar as if the user were actually in the virtual community space. A text input by a user is displayed in the form of a speech balloon of his/her avatar on the monitor screen of each user.

Unlike the old-fashioned chat system in which only characters are displayed on a time-sequence basis, the three-dimensional virtual community provides visually attractive world to users. Because it is possible to receive a response in real time from a user to whom a conversation is being made, the conversation can be exciting. The users can share events and virtual or quasi experiences which occur or are encountered in the virtual community world. In addition to conversation, a user may enjoy a game-like interactive operation in which the user may search for another avatar or escape from a particular avatar within the virtual community space. A change in time or season or in another factor which occurs in the real world may be introduced into the virtual community space so that the virtual community space becomes more realistic, more enjoyable, and more comfortable for users.

Japanese Unexamined Patent Application Publication No. 9-81781, which has been assigned to the present applicant, discloses a three-dimensional virtual space which is displayed by means of three-dimensional graphics so that a user is allowed to freely walk to visit, via an avatar, various locations in the three-dimensional community space. The three-dimensional community space disclosed in the Patent Application cited above may be described using the VRML language. Various cyberspaces in which users are allowed to enjoy a chat via avatars are discussed in Nikkei Electronics, 1996, 9.9 (No. 670), pp. 151–159.

In many chat systems, an avatar is allowed to use various items such as cloths, accessories, and tools, to achieve an improvement in ease of virtual communication among participating users, to make the virtual communication more enjoyable, and to establish a more realistic infrastructure in the virtual community space.

For example, the virtual community space may include a business card system which allows personal information to be exchanged between avatars via business cards, a distribution system (which allows a virtual shop to be opened, virtual money to be used, and items to be exchanged by barter), and/or a virtual mail system. (Japanese Unexamined Patent Application Publication No. 11-203009, which has been assigned to the present applicant, discloses a technique of introducing business cards into a virtual community space. In this technique, communication between users becomes possible by giving a business card to a virtual creature object bred by a user who does not currently have access to the virtual community space.)

However, in many three-dimensional chat systems, participating users are allowed only to visit various locations in the three-dimensional space which has already been built and to use items which have already been given by the system. In other words, the three-dimensional virtual space is a static space for participating users, and the participating users are not allowed to build the virtual space, add an element to the virtual space, and change or modify an existing element. This limits the reality of the virtual community space in which participating users live.

SUMMARY OF THE INVENTION

It is an object of the present invention to provide an excellent system and method for supporting a virtual conversation which is performed in a virtual community having a certain space built on a computer network and in which a plurality of users are allowed to participate.

It is another object of the present invention to provide an excellent system and method for supporting a virtual conversation in a virtual community space in which a plurality of participating users are allowed to freely build the whole of or a part of the virtual community space.

It is still another object of the present invention to provide an excellent system and method for supporting a virtual conversation in a virtual community space in which a plurality of participating users are allowed to add an element to the virtual community space and also allowed to change or modify an existing element.

According to a first aspect, in view of the above, there is provided a virtual conversation support system/method for supporting a virtual conversation which is performed in a three-dimensional virtual community space built and provided on a computer network and in which a plurality of users are allowed to participate, the virtual conversation support system/method comprising: canvas setting means/step for setting a canvas in the three-dimensional virtual community space; and data pasting means/step for inputting data and pasting the data on the canvas.

Herein, the term "system" refers to a logical collection of a plurality of apparatuses (or functional modules which provide particular functions), regardless of whether or not the apparatuses or functional modules are disposed within a single case.

In the virtual community space according to the present invention, a participating user may set a canvas at a desired location within the virtual community space and may paste data on the canvas so as to build an element in the virtual community space. Two or more users may perform, in a cooperative fashion, an operation associated with the same element. This may increase the degree of reality of the lives in the virtual community world, and thus the lives may become more enjoyable.

In the data pasting means/step, an image, another type of data, or information linked to another information resource may be pasted on the canvas. On the wall of such a canvas or a signboard, not only an image such as a picture or a photograph but another object such as a link to a sound or another three-dimensional space, a link (URL (Uniform Resource Locator)) to a WWW page, a banner (combination of image data and a link for advertising a linked site) may also be pasted.

The virtual conversation support system/method may further comprise means/step for allowing an avatar of a user logging in the three-dimensional virtual community space to participate in the three-dimensional virtual community space, In this case, in the data pasting step, image data which is input by performing a drawing operation via the avatar of the user may be pasted on the canvas so as to improve the reality of the three-dimensional virtual community space and to make the virtual community space more enjoyable. If an image with high originality is drawn on a canvas or a signboard so as to enhance the reality of an object, it will more attract other users or avatars.

In the canvas setting means/step, the canvas may be set by creating a wall extending upward from a stroke line which is drawn in a three-dimensional space including only the horizon by a user by means of dragging a mouse, thereby allowing a user or an avatar to place an element such as a canvas or a signboard at a desired arbitrary location in the three-dimensional community space.

The virtual conversation support system/method may further comprise image modifying means/step for modifying an input image in response to an operation performed upon the canvas by a user, thereby making it possible for the user to easily change or modify the canvas or the signboard which has already been created.

In the virtual community space, an image created by a certain user is quasi intellectual property established in the virtual community space, and a canvas or a signboard can be regarded as quasi private property in the virtual community space. In view of the above, the virtual conversation support system/method may further comprise data pasting control means/step for permitting or prohibiting a user or an avatar of the user to paste data on a canvas which has been set by another user, so as to protect the intellectual property.

According to a second aspect of the present invention, there is provided a virtual conversation support system/method for supporting a virtual conversation which is performed in a three-dimensional virtual community space built and provided on a computer network and in which a plurality of users are allowed to participate, the virtual conversation support system/method comprising: means/step for dividing at least a part of the three-dimensional community space into regions; and means/step for transferring the right to use a region to a user logging in the three-dimensional virtual community space.

That is, the virtual conversation support system/method provides a service model in which the community place is divided, for example, into an array of rectangular regions, and the regions are assigned to respective users or sold at particular prices. A user who participates in this service model is given a certain area, and the user is allowed to freely add data such as a canvas or a signboard within the given region. That is, the user is given the right to freely build an element in the virtual space.

A user who does not have his/her own region (or a user who is present outside his/her own region) is allowed to move from one region to another, or to linked locations. Basically, a user is not allowed to paste data such as an object or linked information on a signboard or a canvas disposed in a region owned by another user unless permission is given by the owner of the region.

The virtual conversation support system/method may further comprise charging means/step for charging a predetermined price to a user to whom the right to use a region has been transferred, thereby making it possible for the service provider of the virtual community space to make a profit as a result of providing the service.

This makes users have a competitive spirit who participate in the virtual community space according to the present invention. As a result, users try to build their own regions into a more attractive form. Thus, the service provider who manages the three-dimensional virtual community place does not necessarily have to design a special virtual world, but a three-dimensional virtual space is built into a very attractive form by users. Once a competition has occurred among users, the advance in the virtual community space is accelerated. In other words, in accordance with the present invention, the three-dimensional virtual community space in which users live together becomes very realistic, and the chat becomes very enjoyable.

When an image with high originality or valuable information is described on a canvas or a signboard by a user or his/her avatar, the image or information will attract other users. In such a case, many users or avatars come to the location in the community place where such a canvas or a signboard is placed. If advertisement information is described on such a signboard which is viewed by many users, a high effective of advertising can be achieved. This means that, in the community place, a location at which an excellent signboard is disposed or a region near that location can be regarded as having a high economic value in analogy to lands in the real world. In other words, variations in prices, which occur in the real world, are introduced into the virtual community world. More specifically, the values of regions in the virtual community space vary as a result of the economic phenomenon.

To deal with a state in which a particular regions has become popular and the economic value of that regions has become high, the virtual conversation support system/method may provide a service which allows the right of a region to be resold among participating users via auction held on the network.

To this end, the virtual conversation support system/method may further comprise means/step for receiving a request for selling the right to use a region from a user having the right to use the region; means/step for announcing that the right to use the region is on sale; means/step for receiving a request for purchasing the right to the region on sale; and means/step for comparing the selling request and the purchasing request with each other to determine whether the right to use the region should be transferred.

The virtual conversation support system/method may further comprise means/step for, when the right to use the region is sold, charging a fee or a price to the user who has sold the right to use the region and/or the user who has purchased the right to use the region, thereby making it possible for the service provider of the virtual community space to make a profit as a result of providing the service.

To allow the auction of the right to use regions to be performed in an easy fashion, the selling request for selling the right to use the region may include data indicating a proposed selling price and the purchasing request for purchasing the right to use the region may include data indicating a proposed purchasing price, and the means/step for determining whether the right to use the region should be transferred may make the determination on the basis of a result of comparison between the proposed selling price and the proposed purchasing price.

According to a third aspect of the present invention, there is provided a storage medium including computer software which is physically stored in a computer-readable form on the storage medium so that the computer software is to be executed by a computer system to perform a virtual conversation support process for supporting a virtual conversation which is performed in a three-dimensional virtual community space built and provided on a computer network and in which a plurality of users are allowed to participate, the computer software comprising a canvas setting step for setting a canvas in the three-dimensional virtual community space; and a data pasting step for inputting data and pasting the data on the canvas.

According to a fourth aspect of the present invention, there is provided a storage medium including computer software which is physically stored in a computer-readable form on the storage medium so that the computer software is to be executed by a computer system to perform a virtual conversation support process for supporting a virtual conversation which is performed in a three-dimensional virtual community space built and provided on a computer network and in which a plurality of users are allowed to participate, the computer software comprising a step for dividing at least a part of the three-dimensional community space into regions; and a step for transferring the right to use a region to a user logging in the three-dimensional virtual community space.

The storage medium according to the fourth aspect is used to provide computer software stored in a computer-readable form to a general-purpose computer system capable of executing various program codes. A specific example is a removable and portable storage medium such as a CD (Compact Disc), a FD (Floppy Disc), and a MO (Magneto-Optical Disc). Technically, it is also possible to provide computer software in a computer-readable form to a particular computer system via a network (either a wireless network or a cable network).

The program storage medium defines a cooperative relationship in structure or function, for realizing a function of a particular computer program on a computer system, between the computer program and the storage medium. That is, by installing particular computer software onto a computer system via a storage medium according to the third or fourth aspect of the present invention, a cooperative operation on the computer system becomes possible thereby making it possible to perform an operation thereon in a similar manner to the virtual conversation support system/method according to the first or second aspect of the present invention.

These and other objects and features of the present invention will become more apparent from the following detailed description of embodiments with reference to the accompanying drawings.

BRIEF DESCRIPTION OF THE DRAWINGS

FIG. 16 is a flow chart illustrating a procedure of selling the ownership of a region in a community place via an auction on a network.

DESCRIPTION OF THE PREFERRED EMBODIMENTS

The present invention is described in further detail below with reference to embodiments in conjunction with the accompanying drawings.

1. Construction of Community System

Figure 1:
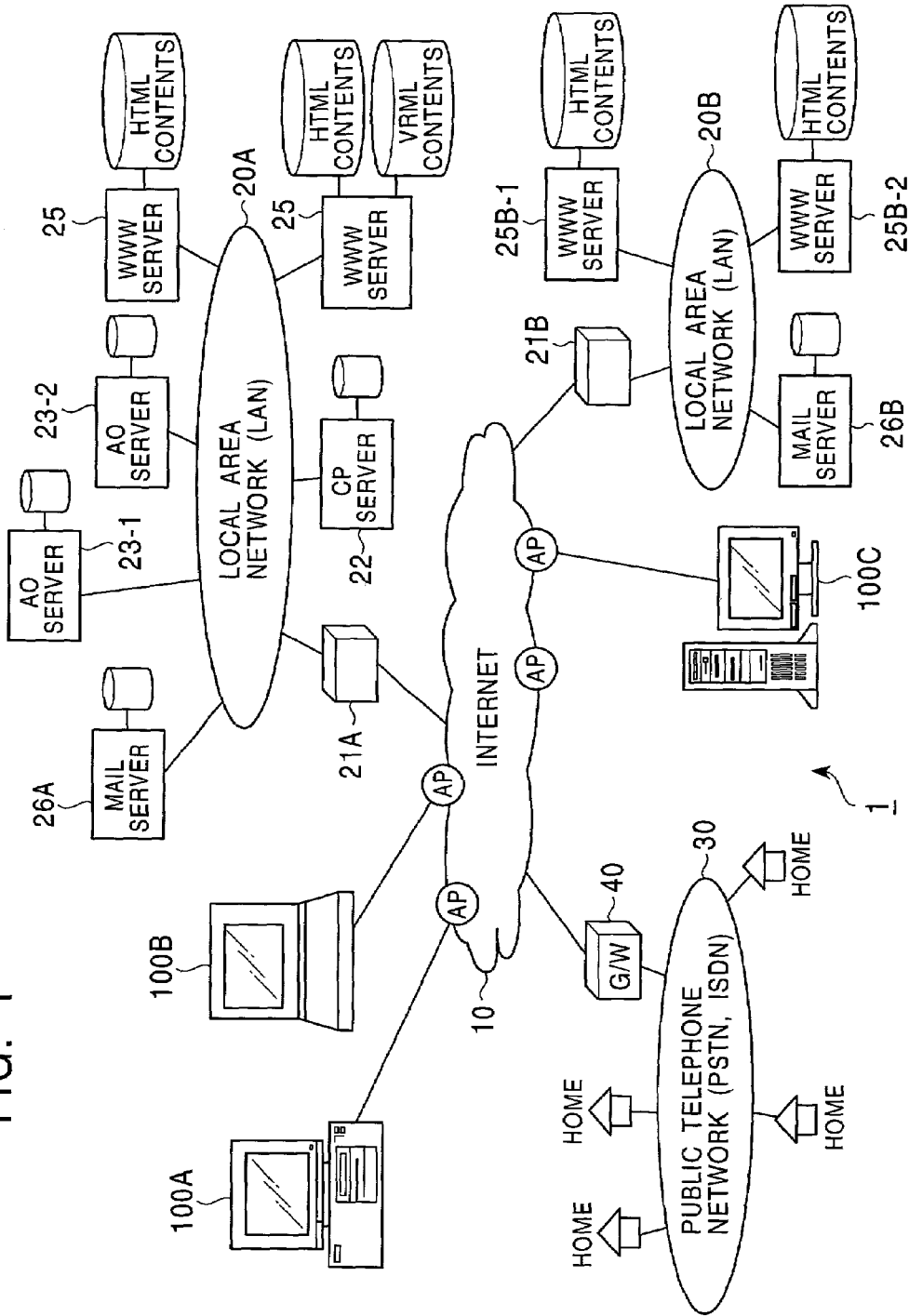
FIG. 1 is a schematic diagram illustrating a network computing system suitable for building a virtual community world therein according to the present invention.

FIG. 1 schematically illustrates a network computing system 1 suitable for building a virtual community world therein according to the present invention. The network computing system 1 may be, for example, a distributed network. In a distributed network environment, users do not need to know locations of resource objects such as a program or data. Procedures and methods executed by computers are held and managed in a distributed fashion on the network. For example, a process running on a computer on the network may call and execute a procedure of a process which runs on another computer.

In this network computer system, as will be described later, a community system is built in a three-dimensional virtual world and is shared by users. The community system includes the following three types of elements: browsers (CP browsers) for browsing and navigating a shared virtual space (hereinafter also referred to as a community place (CP)); a community place (CP) server for managing the virtual community space; and an AO (Application Object) which is a shared application development environment.

The network computing system 1 includes a very large number of computer systems connected to one another. These computer systems are distributed over the real world. Some of these computer systems are servers which provide various resource services for some or no fee, and some computers are clients which request servers to provide resource services.

As shown in FIG. 1, the network computing system 1 also includes communication media such as the Internet 10, local area networks (LANS) 20A, 20B and so on, and public telephone networks 30 provided by telephone companies in various countries. In practice, each of LANs 20A, 20B and so on may be a single network segment or may include a plurality of segments connected to one another via a router.

The Internet 10 and the local area networks 20A, 20B and so on are connected to one another via a router 21A, 21B and so on. As described earlier, the Internet 10 is a network which has grown to a huge scale via mutual connections among a large number of servers of local area networks 20A, 20B, and so on. The servers on the Internet 10 or the local area networks 20A, 20B and so on can get access to one another in accordance with a predetermined communication protocol such as TCP/IP (Transmission Control Protocol/Internet Protocol).

A network such as the Internet 10 or LANs 20A, 20B or the like is connected to a public telephone network 30 via a gateway system 40. The public telephone network 30 may include a PSTN (Public Switched Telephone Network) or an ISDN (Integrated Service Digital Network).

Each of the computer systems on the Internet 10 (and also computer systems connected to the Internet via a LAN) has its own IP address which is distinguishable on the Internet 10. In other words, Each IP address serves as a logical node between a computer and the Internet 10.

On the Internet 10, there are communication companies called Internet service providers (ISP) which provide an Internet connection service for general users who cannot make an IP connection to the Internet 10 via a dedicated line. According to a Japanese regulation, a profit-making Internet service provider should make a registration as a type-2 carrier. An example of an ISP is "So-net". General users may make an IP connection to the Internet by means of dial-up access to a server of a service provider, that is, to an access point (AP) (this type of connection is also called "dial-up IP connection), and thus users do not have to acquire their own IP addresses which need high cost.

The majority of computers (PCs) of general users 100 connected to the Internet 10 by means of IP connection via service providers (ISPS) operate as clients which can request WWW (World Wide Web) servers or other various servers to provide services.

In addition to the dial-up IP connection service, many Internet service providers also provide various application services via the Internet 10, such as chat, BBS (Bulletin Board System), and electronic mail services.

A company or an organization other than the Internet service providers may provide application services such as chat, BBS, and electronic mail services.

In the example shown in FIG. 1, an Internet service provider manages a LAN 20A and provides a chat system, that is, a community system according to the present embodiment of the invention. The community system builds a virtual world called a community place (CP) on the network. Each logging-in user can enjoy a virtual communication such as a chat via an avatar.

Herein, the "chat" refers to a service by which users at distant locations can communicate with one another in real time via the Internet 10. In particular, the three-dimensional chat according to the present embodiment provides an environment in which logging-in users can communicate with one another in real time by operating their own avatars, which serve as incarnations of the respective users in the three-dimensional virtual community world drawn by means of a three-dimensional graphics. The community system in the form of the three-dimensional virtual community world on a WWW system may be described, for example, using VRML (Virtual Reality Modeling Language) 97 according to the ISO (International Organization for standardization) standards, and the operation may be described using Java. Such a three-dimensional virtual community place may be displayed and navigated using a VRML browser.

On the LAN 20A, there is provided a community place (CP) server 22,which builds and manages the virtual community place on the Internet 10 so as to provide an environment in which various virtual/quasi social activities can be performed. Furthermore, one or more application object (AO) servers 23-1, 23-2, and so on are also provided on the LAN 20A.

On the LAN 20A, there may also be one or more WWW servers 25 which provide HTTP (Hyper Text Transfer Protocol) resource objects such as HTML (Hyper Text Markup Language) contents and one or more mail servers 26 for transmitting and receiving electronic mails to and from user accounts. It is possible to make an Internet-connection to each of servers 22, 23-1, 23-2, 25, and 26 on the LAN 20A via a router 21A.

In the present embodiment, the WWW server 25 provides, in addition to usual HTML contents, a VRML file in which a three-dimensional virtual community place is described. The VRML file includes descriptions about the virtual community place, shared applications, and the address (URL (Uniform Resource Locator)) of the virtual community place (CP) server 22 or link reference information thereof.

Each computer (PC) 100 via which a user logs in the three-dimensional virtual community place includes a HTML browser for browsing HTML contents provided by the WWW server 25 and also includes a VRML browser for dealing with VRML files. In the present embodiment, the VRML browser is used to display and navigate the community place, and thus, hereinafter, the VRML browser will be referred to as a "CP browser". The HTML browser and the CP browser may run on the same platform provided by an operating system such as Windows 95/98/NT available from Microsoft Corporation of the USA.

Each object placed in the three-dimensional virtual community place built using VRML may behave in an autonomous fashion in response to an event generated in response to an operation performed by a user or in response to a timer event which occurs when a predetermined time has elapsed.

The mechanism of the behavior is achieved by three elements: "sensor", "routing", and "script", which cooperate as described below.

(1) A sensor node is assigned to a node such as an object placed in the three-dimensional virtual community place and is described in a VRML file so that the sensor node generates an event in a VRML scene when the sensor node detects an external event on the basis of a change in that field.

(2) The generated event is routed or transferred, in accordance with the routing described in the VRML file, to an external script which is a program according to which the object behaves.

(3) The external script includes a method which is called when the event is received. When the event is input to the external script via the routing, the method of the external script is executed, and the field value of the corresponding node in the VRML scene is updated in accordance with the result of the method and the description of the routing.

The sensor node described in VRML includes a touch sensor which generates an event when a specified object is clicked or a mouse cursor has passed through the object, a proximity sensor which generates an event when the viewpoint of a user falls into a predetermined region, and a timer sensor which generates an event when a predetermined time has been reached or repeatedly in predetermined intervals of time.

Figure 2:
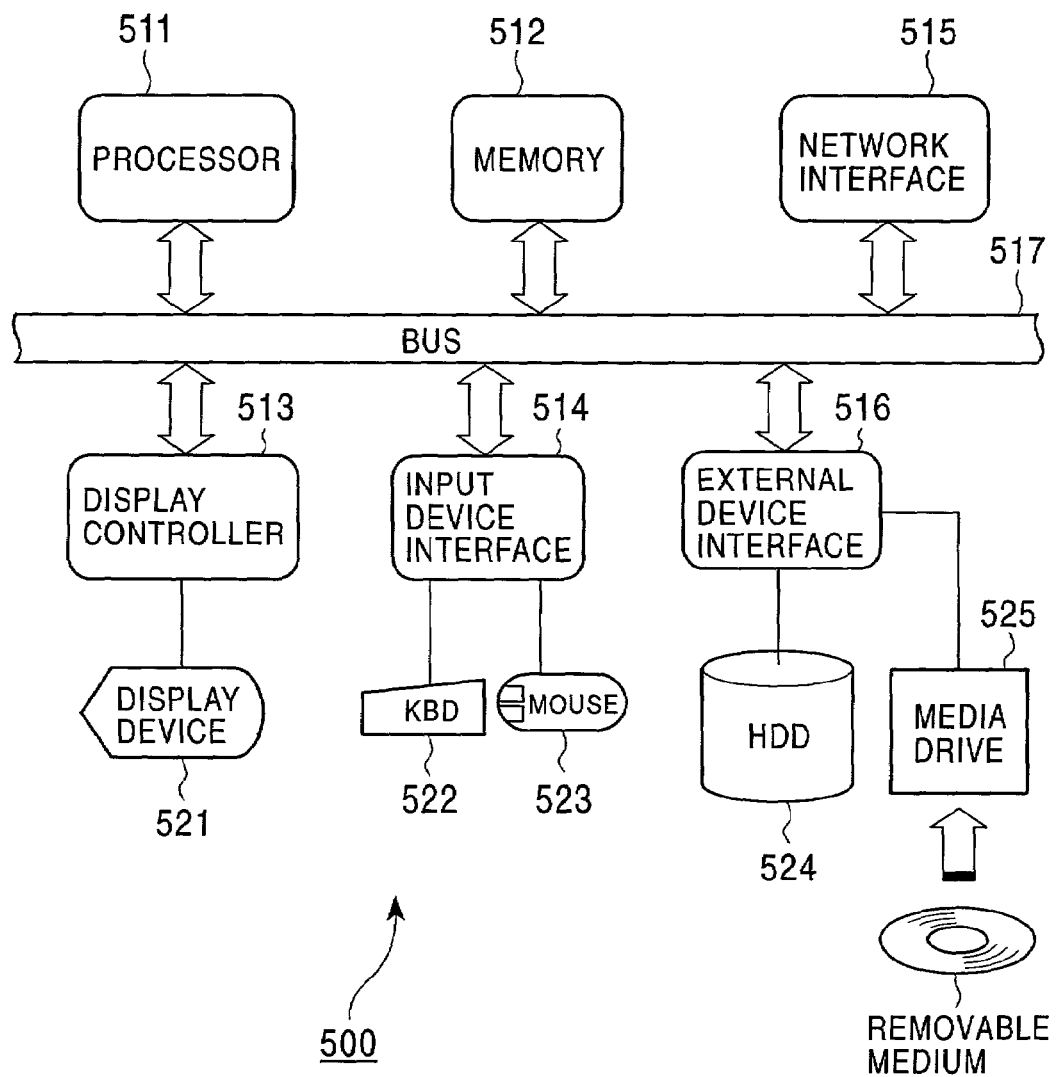
FIG. 2 is a schematic diagram illustrating an example of a hardware configuration of a computer system.

In FIG. 1, a host computer system called a server or a client may be generally implemented on a computer system such as a work station (WS) or a personal computer (PC) by running a server application or client application thereon. FIG. 2 is a schematic diagram illustrating an example of a hardware configuration of such a computer system 500. Each component of this system 500 will be described below.

The system 500 includes a processor 511 serving as a main controller formed of, for example, a LSI (Large Scale Integration) chip called a CPU (Central Processing Unit). The Processor 511 executes various applications under the control of an operating system (OS). Preferably, the OS supports the bit-map display format and provides a GUI (Graphics User Interface) environment. Specific examples include UNIX and Windows 98/NT available from Microsoft Corporation of the USA.

As shown in FIG. 2, the processor 511 is connected to other devices (which will be described later) via a bus 517. Each device on the bus 517 is assigned a unique memory address or I/O address so that the processor 511 can access each device in accordance with its address. The bus 517 is a signal transmission bus including an address bus, a data bus, and a control bus which are shared by the devices. A specific example is a PCI (Peripheral Component Interconnect) bus.

A memory 512 serves to store a program code executed by the processor 511 and to temporarily store work data being processed. Herein, the memory 512 shown in FIG. 2 may include both nonvolatile and volatile memories.

A display controller 513 is a controller dedicated to actually executing a draw command issued by the processor 511. The display controller 513 has a bitmapping capability according to, for example, the SVGA (Super Video Graphic Array) or XGA (eXtended Graphic Array) standard. Graphics data processed by the display controller 513 is output to a display 521 after being temporarily stored in a frame buffer (not shown) or the like. As for the display 521, for example, a CRT (Cathode Ray Tube) display or a liquid crystal display may be used.

An input device interface 514 serves to connect a user input device such as a keyboard 522 and a mouse 523 to the system 500. In response to inputting of coordinates via the keyboard 522 or the mouse 523, the input device interface 514 generates an interrupt to the CPU 511 which in turn activates an interrupt handler (as is known in the art).

A network interface 515 serves to interface the system 500 with a network such as a LAN (Local Area Network) in accordance with a predetermined communication protocol such as Ethernet. In general, the network interface 515 is provided in the form of a LAN adapter card and is installed in a PCI bus slot on a mother board (not shown). However, instead of using the network interface, the system 500 may be connected to an external network via a modem (not shown).

A plurality of hosts (computers) are connected transparently via the LAN such that a distributed computing environment is built. Some host computers serves as routers and are connected to an external network such as another LAN or the Internet. Software programs or data contents are distributed via the Internet (as is known in the art).

An external device interface 516 serves to connect an external device such as a hard disk drive (HDD) 524 and a media drive 525 to the system 500. The external interface 516 operates in accordance with an interface standard such as the IDE (Integrated Drive Electronics) or SCSI (Small Computer System Interface) standard.

The HDD 524 is an external storage device including a fixed magnetic disk serving as a storage medium (as is known in the art) and is superior to other types of external storage devices in terms of the storage capacity and data transfer rate. A software program may be stored in an executable form on the HDD 526. This is called installation of a program into a system. In general, programs such as an operating system program code, an application program, and a device driver, which are to be executed by the processor 511, are stored in a nonvolatile fashion on the HDD 524.

The media driver 525 serves to access data storage surface of a removable medium such as a CD (Compact Disc), a MO (Magneto-optical disc), or a DVD (Digital Versatile Disc) mounted thereon. A removable medium is generally used to back up data such as a software program or a data file in a computer-readable form or used to transfer (or sell or distribute) data between systems.

An example of such a computer system 500 is an IBM PC/AT (Personal Computer/Advanced Technology)—compatible personal computer or a personal computer of an upgraded version.

2. Operation Architecture of Community System

Figure 3:
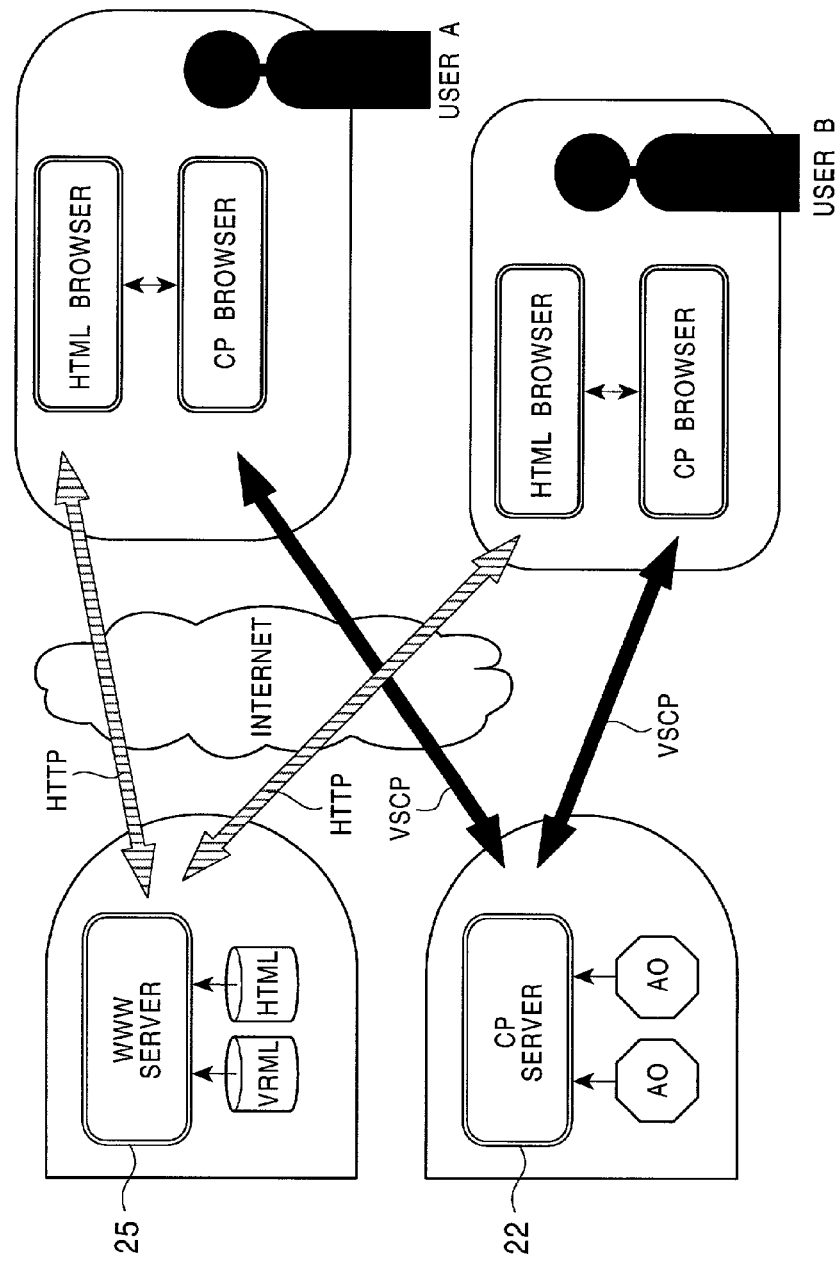
FIG. 3 is a schematic diagram illustrating an operation architecture which allows a virtual community world to be displayed on a computer of a user logging in the world, and which also allows the user to navigate the virtual community world, according to an embodiment of the present invention.

FIG. 3 schematically illustrates an operation architecture which allows a virtual community world to be displayed on a computer 100 of a user who has logged in the community system, that is, the virtual community world according to the present embodiment, and which also allows the user to navigate the virtual community world. As described earlier, in addition to a HTML browser, a CP browser capable of dealing with a VRML content is running on the computer 100 of each user such as a user A and a user B. As for the HTML browser, "Netscape Navigator" available from Netscape Communications Corporation of the USA or "Internet Explorer" available from Microsoft Corporation of the USA may be employed.

The user computer 100 is connected to the Internet 10 via a predetermined procedure such as a dial-up IP connection to a nearest access point (AP). The user computer 100 can get access to a WWW server 25 using the HTML browser in accordance with a HTTP protocol to acquire a VRML file in which the virtual community world is described. The acquired VRML file is transferred to the CP browser.

The CP browser analyzes the VRML file received from the HTML browser and displays the content of the VRML file on the browser screen. In the case where an address of a CP server 22 is described in the VRML file, the CP browser attempts to make a connection to the CP server 22. CP browsers which have acquired the same VRML file will make a connection (log in) to the same CP server 22 and share the same VRML scene described in the VRML file, that is, the three-dimensional virtual community world.

After logging in the virtual community world by making a connection to the CP server 22, communication between the CP server 2 and the CP browser is performed using a predetermined server-client protocol (in the present invention, such a protocol is referred to as a VSCP (Virtual Society Server Client Protocol)). The VSCP protocol has the capability of informing the CP server 22 of a change made by a user via the CP browser (such as acquisition or discard of an item via an avatar) and also has the capability of further transferring information from the CP server 22 to another CP browser.

In the virtual community world provided by the CP server 22, there are various objects including avatars of the respective users, pets (virtual creatures) bred by avatars, etc. Applications associated with those objects, the operations thereof, and other matters in the virtual community world are shared by users who reside (log) in the virtual community world. In the present invention, such an application is referred to as a shared application.

An AO (Application Object) on the AO server 23 manages the shared application. The AO is generally developed using the Java language or the C++ language. The AO provides an event handler for controlling access to internal information of the CP server 22 or a timer, and also an API (Application Programming Interface) for controlling a shared object managed by the AO. Herein, the shared objects refer to objects which appear on the browser running on each user computer (and which are shared by the respective user computers). Examples of shared objects include avatars of the respective users, virtual creatures (pets) bred by avatars, and items acquired and held by logging-in users. Acquisition or discard of an item is performed by a logging-in user by operating his/her avatar or a pet of the avatar so as to pick up an item on a roadside to purchase an item displayed in a showcase of a virtual shop.

Japanese Patent Application No. 9-154471 (Japanese Unexamined Patent Application Publication No. 10-328416), which has been assigned to the present applicant, discloses an apparatus and method for providing a virtual space in which growth parameters of an avatar and a virtual creature such as a virtual pet in a virtual community space are managed such that the avatar and the virtual creature behave autonomously under a remote control of an user.

The AO server 23 can communicate with the CP server 22 using a predetermined application protocol. Therefore, it is not necessary required that the CP server 22 and the AO server 23 should operate on the same single server machine, but it is allowed to employ a scalable architecture in which the CP server 22 and the AO server 23 are separate computer systems as in the example shown in FIG. 1.

Figure 4:
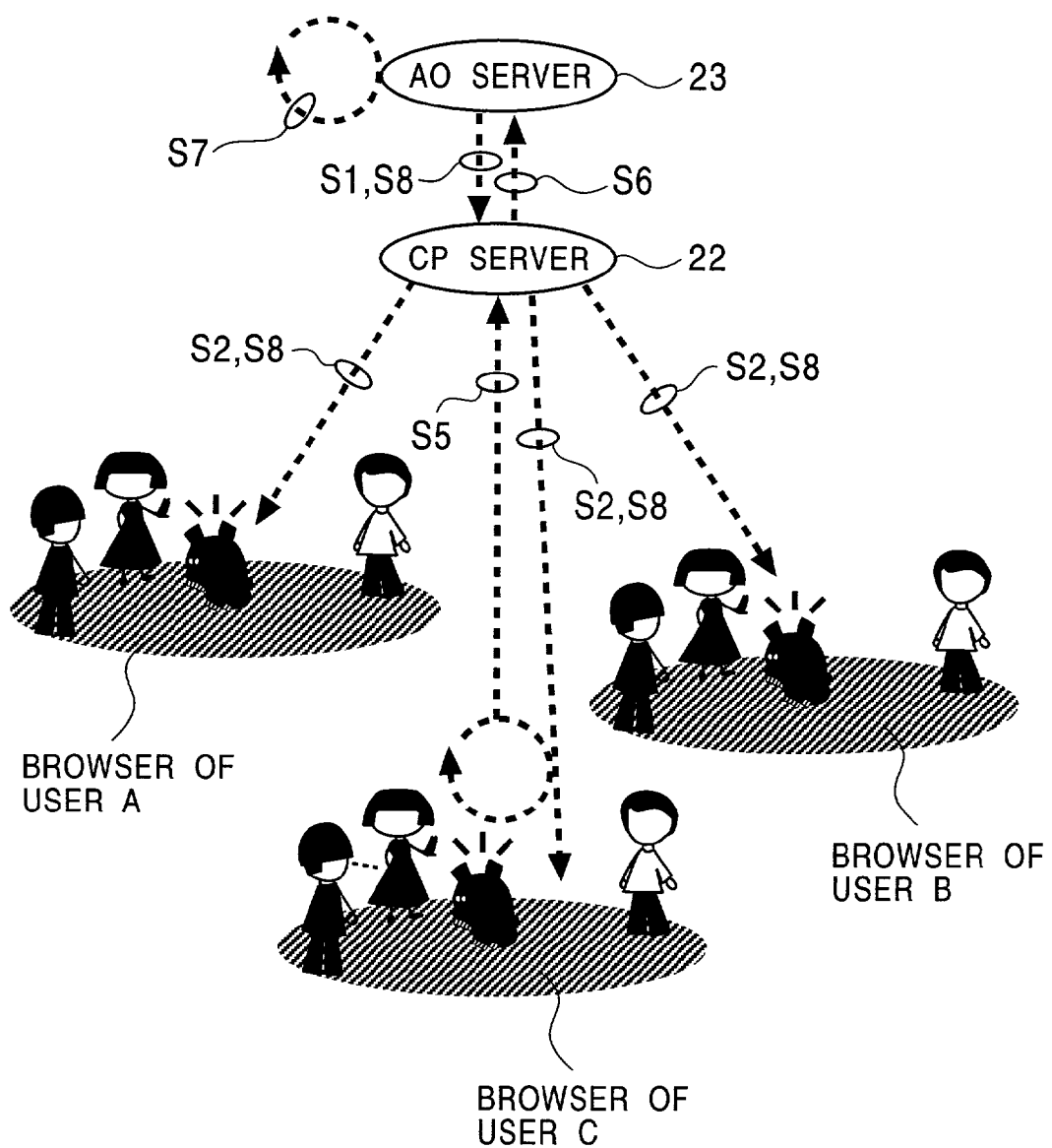
FIG. 4 is a diagram illustrating an operation mechanism of an AO according to the embodiment of the invention, for a case, as an example, in where an operation occurs when a user logs in a virtual community world and clicks on a pet (shared application) of the avatar of that user.

FIG. 4 illustrates an operation mechanism of an AO according to the present embodiment. In the specific example in FIG. 4, an operation is illustrated which occurs when a user logs in a virtual community world and clicks on a pet (shared application) of the avatar of that user. In this example, in response to the clicking operation, the pet cries in the virtual community world displayed on any user computer.

When the AO server 23 is connected to the CP server 22, the AO server 23 requests the CP server 22 to add shared objects managed by the AO server 23 to the virtual community space (S1).

The CP server 22 transfers the received request to all CP browsers connected to the CP server 22. As a result, the shared objects appear on all CP browsers, that is, on the monitor screens of all logging-in users (S2).

If a user selects (clicks on) a shared object via his/her CP browser (S3), a corresponding script is activated on the CP browsers (S4). The script transmits a message to the CP server 22 in accordance with the VSCP protocol (S5).

The CP server 22 transfers the message to the AO server 23 which manages the selected shared object (S6). The AO server 23 processes the received message and returns the same message to all CP browsers via the CP server 22 (in accordance with the VSCP protocol) (S7). As a result, the message is transferred to the corresponding shared object on each CP browser, and the same operation is performed (S8). Although not shown in FIG. 4, the operation is performed in a similar manner when an item is acquired or discarded by an avatar or a virtual pet.

In this case, if a logging-in user performs an operation on his/her CP browser to acquire or discard an item, a corresponding script is activated on the CP browser. The script transmits a message to the CP server 22 in accordance with the VSCP protocol.

The CP server 22 transfers the message to the AO server 23 which manages the selected shared object. The AO server 23 processes the received message and returns the same message to all CP browsers via the CP server 22 (in accordance with the VSCP protocol). As a result, the message is transferred to the corresponding shared object on each CP browser, and the same operation is performed.

3. Addition of an Element to Community Place

In the community place according to the present embodiment, the figure of each logging-in user is displayed as an avatar, and each user can visit various locations in the community place via his/her avatar. An image viewed by the avatar of each user or an image of a scene including the avatar may be displayed on the screen of the terminal of each user. The figures of the other users are displayed as avatars.

In the community place according to the present embodiment, each logging-in user is allowed to add an element to the community place or change or modify an existing element via his/her avatar. In other words, the user is allowed to build a virtual community space. Two or more users may perform, in a cooperative fashion, an operation associated with the same element. This may increase the degree of reality of the lives in the virtual community world, and thus the lives may become more enjoyable.

Figure 5:
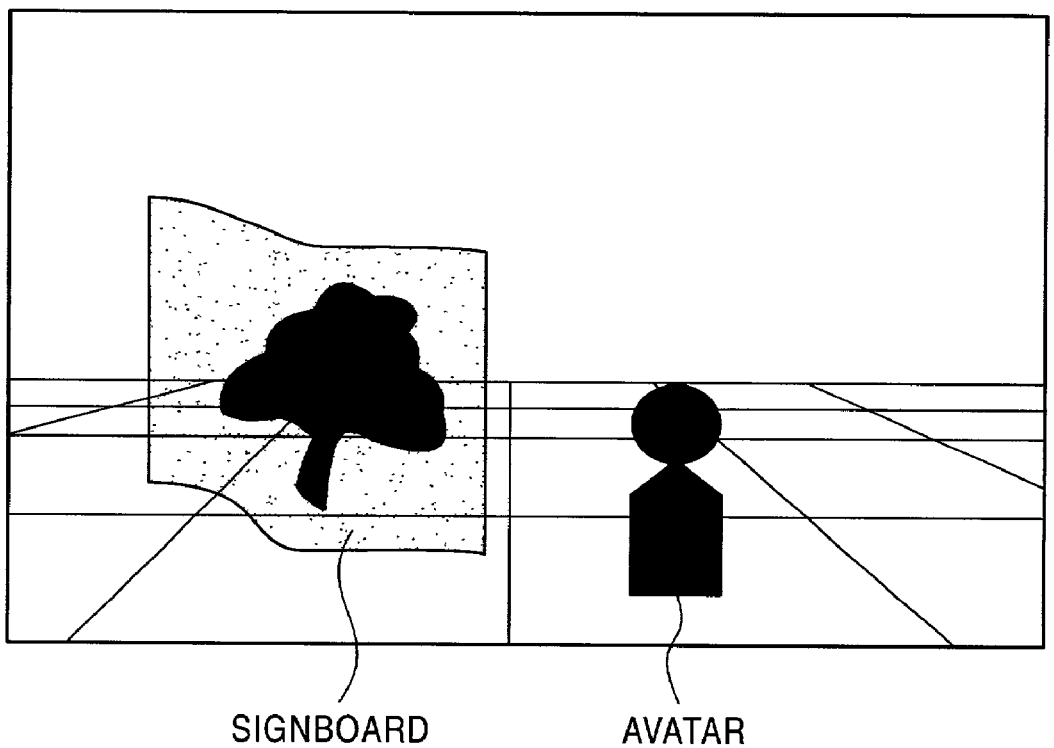
FIG. 5 is a diagram illustrating a community place in which an object such as a signboard is disposed.

One type of an item which can be added to the community place by a user is an item which is placed on the floor of the community place. Specific examples of this type of items include a building and a signboard. A user may draw or paste a two-dimensional image on the surface of a building or a signboard by dragging a mouse thereby realizing a desired three-dimensional scene (FIG. 5). If an image with high originality is drawn on a canvas or a signboard so as to enhance the reality of an object, it will more attract other users or avatars.

An image editing procedure which allows a user to create a wall such as a signboard in the three-dimensional community place and draw a picture thereon is described below.

Figure 6:
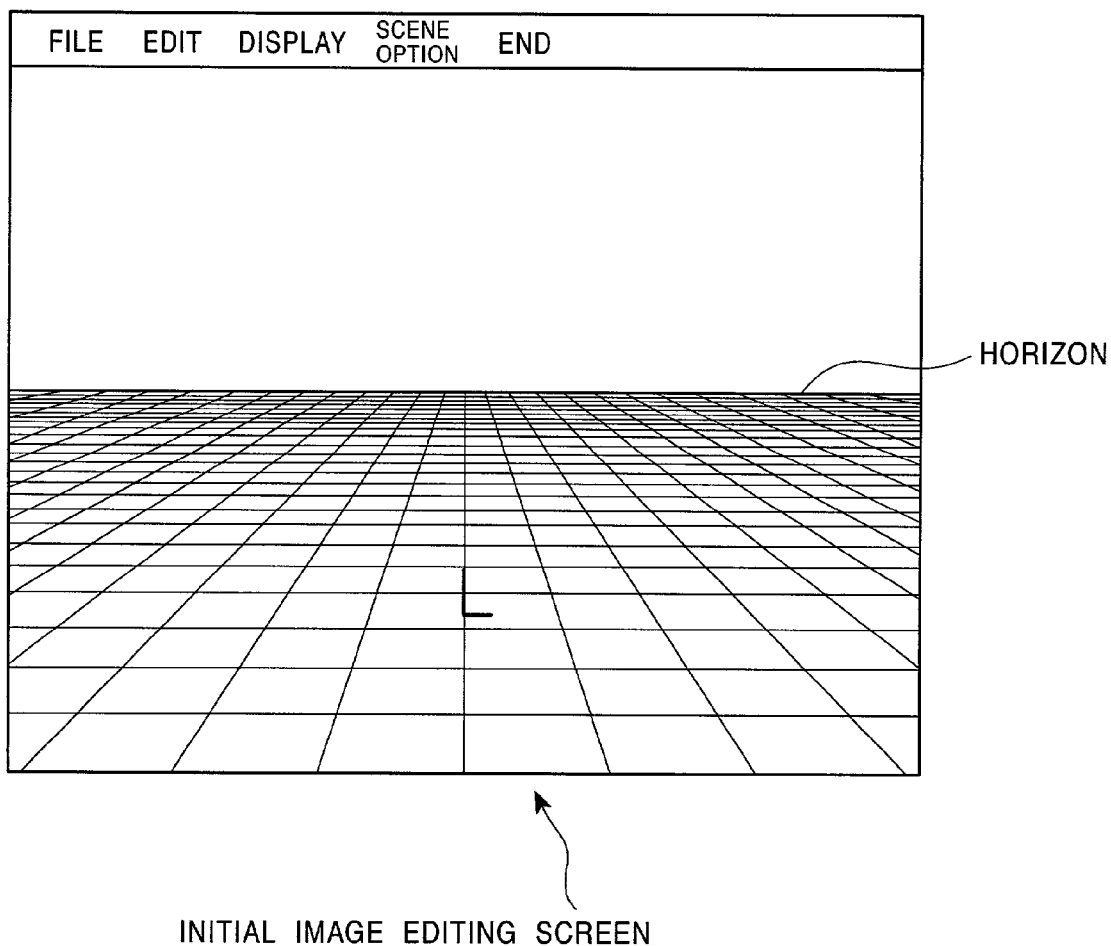
FIG. 6 is a diagram illustrating an example of an image of a community place which is initially displayed on a screen.

Herein, in an initial state, the community place is assumed to include only the horizon as shown in FIG. 6, although the initial community place may include other objects such as a building. A user is allowed to perform an image editing operation to draw, for example, a stroke line via a common GUI operation such as a clicking operation or a drag-and-drop operation using a coordinate input device such as a mouse 523.

Information about an operation performed in the community place by a user is transmitted to all user terminals via the CP server 22 in accordance with the VSCP protocol, and the operation performed by any user is reflected as behavior of the avatar of that user in the image displayed on each user terminal. In other words, if an image is edited on some user computer 100, data indicating the result of the editing process is transmitted to the other user computers via the CP server in accordance with the VSCP protocol so that the same image is displayed on all user computers.

In general, an image editing operation for a community place may be performed by a user in accordance with the following procedure.

(1) A stroke line is drawn in a three-dimensional space.

(2) In response, a wall extending upward from the stroke line is created.

If a stroke like is drawn into the form of a curved line, the resultant wall has a curved surface.

(3) A user draws a picture on the wall by regarding the wall as a canvas.

The picture drawn by the user is mapped onto the wall such that a three-dimensional picture is obtained.

(4) Another wall is then created to obtain another canvas, and a picture is drawn thereon.

The above process of drawing a picture on a canvas is performed repeatedly until a desired three-dimensional scene has been obtained.

(5) The three-dimensional image may be modified by rotating the canvas or moving the viewpoint.

The rotation of the canvas and the movement of the viewpoint may be accomplished by using a dialog menu.

The result of the operation performed by any user is transmitted to all user terminals via the CP server 22 in accordance with the VSCP protocol so that resultant information is shared by all users. That is, the community place is shared in real time by all user terminals.

An example of an operation of drawing a three-dimensional image in the community place is described below with reference to FIGS. 7 to 14.

Figure 7:
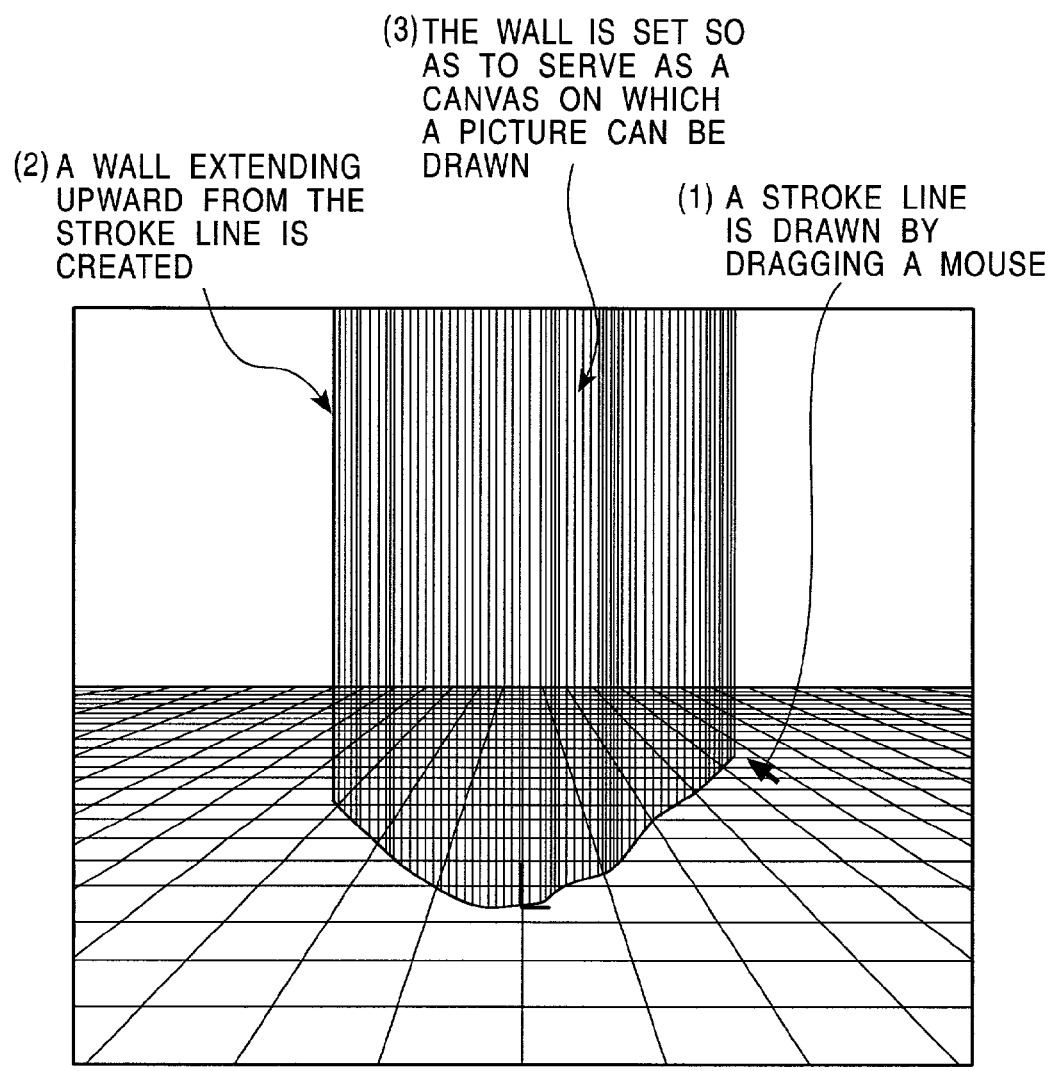
FIG. 7 is a diagram illustrating a manner in which a three-dimensional image is drawn in the community place according to an embodiment of the present invention.

First, by dragging a mouse, a stroke line is drawn on the ground in the three-dimensional space including only the horizon (FIG. 6). In response to this operation, a wall extending upward from the stroke line is created (FIG. 7). If the stroke line was drawn into the form of a curved line, the resultant wall has a curved surface.

Figure 8:
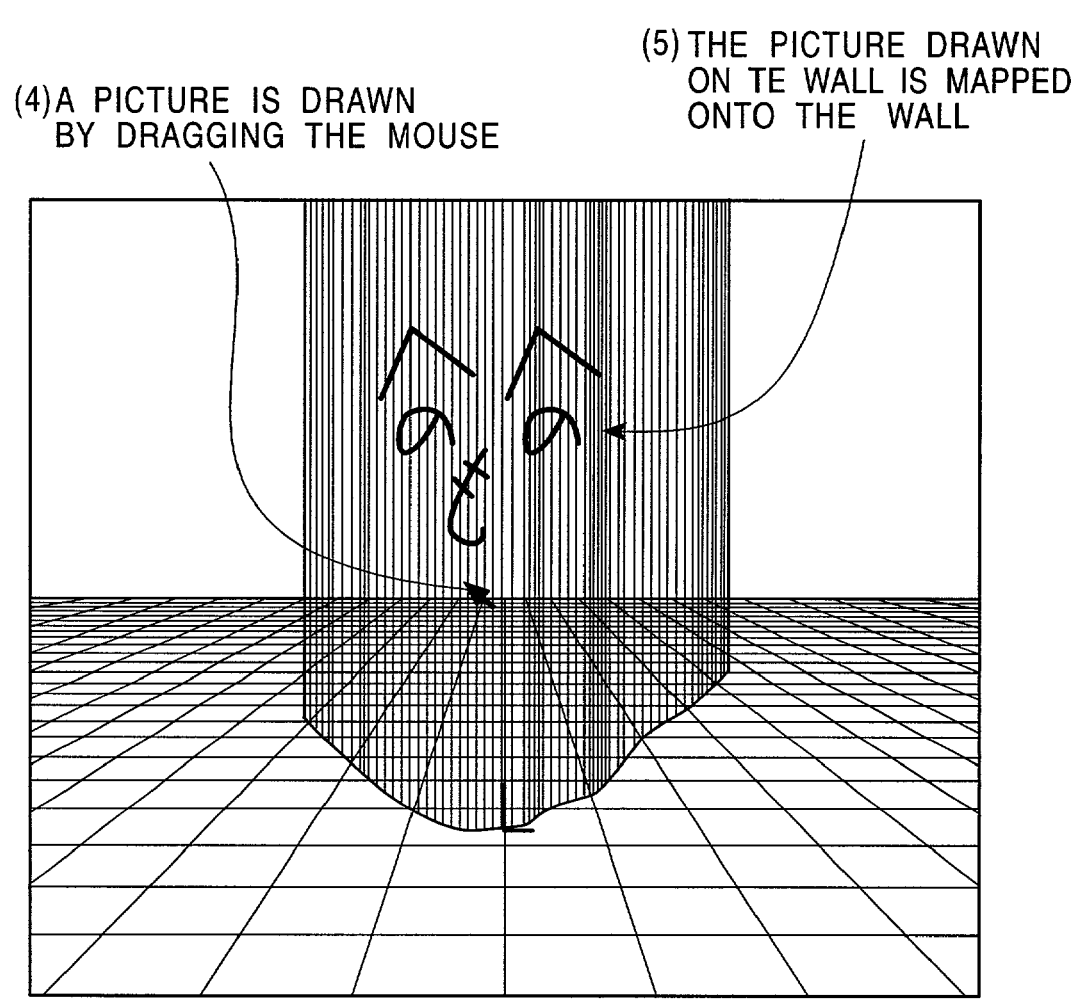
FIG. 8 is a diagram illustrating a manner in which a three-dimensional image is drawn in the community place according to the embodiment of the present invention.
Figure 9:
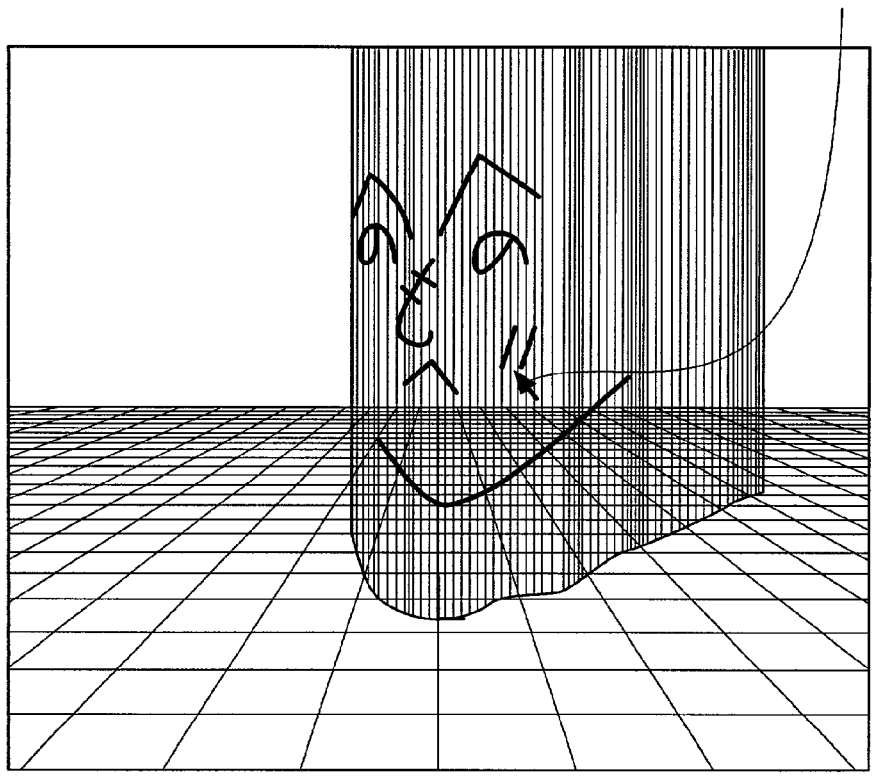
FIG. 9 is a diagram illustrating a manner in which a three-dimensional image is drawn in the community place according to the embodiment of the present invention.

The wall serves as a canvas on which a user is allowed to draw a picture. That is, the user may draw a picture on the wall by dragging a mouse (FIG. 8). In this drawing operation, the size or the color of the pen point may be specified via a dialog menu. A line which has been drawn may be erased using an eraser.

The picture drawn is mapped onto the wall such that a three-dimensional picture is obtained. In the example in FIG. 8, a human face in the form of a cartoon is drawn on the canvas.

The user may rotate the canvas or move the viewpoint by performing a predetermined operation (FIG. 9) to obtain a desired three-dimensional scene.

Figure 10:
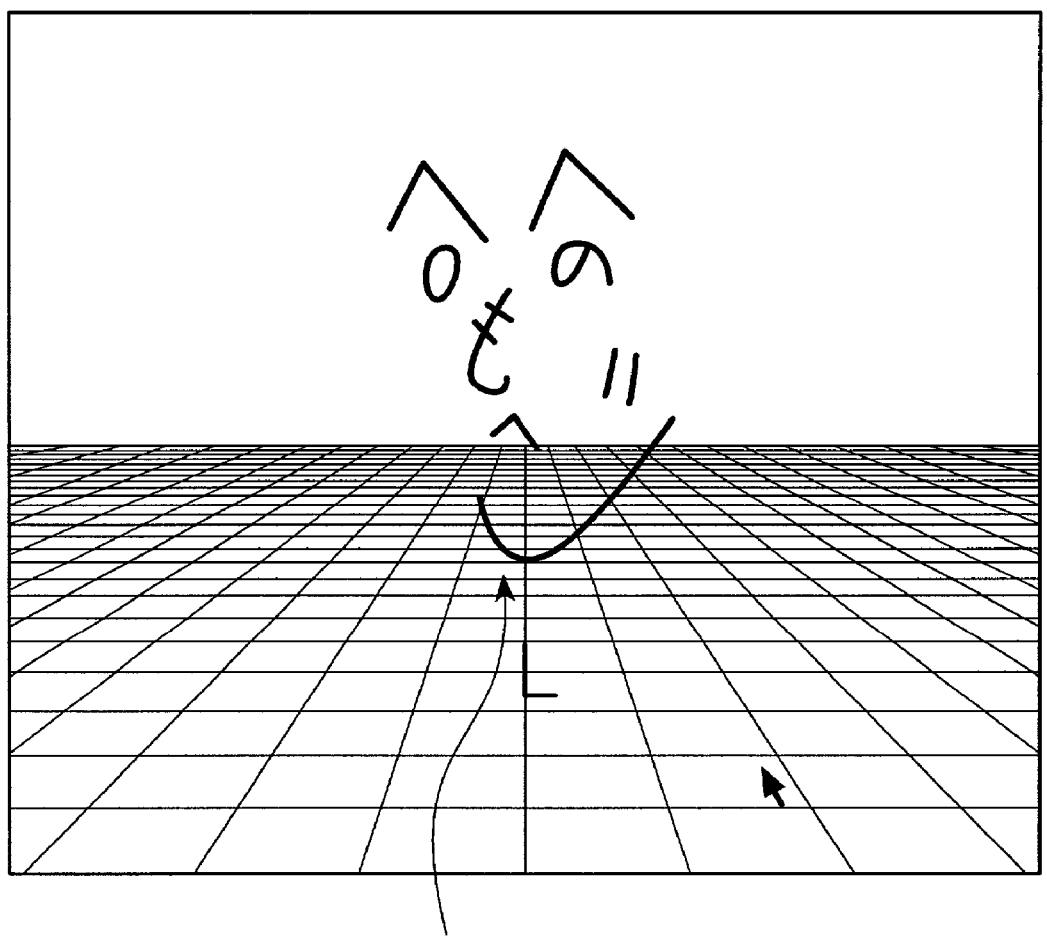
FIG. 10 is a diagram illustrating a manner in which a three-dimensional image is drawn in the community place according to the embodiment of the present invention.

The canvas may be deleted from the screen by performing a corresponding operation (as described earlier). After deleting the canvas, only the three-dimensional image remains on the screen (FIG. 10).

Figure 11:
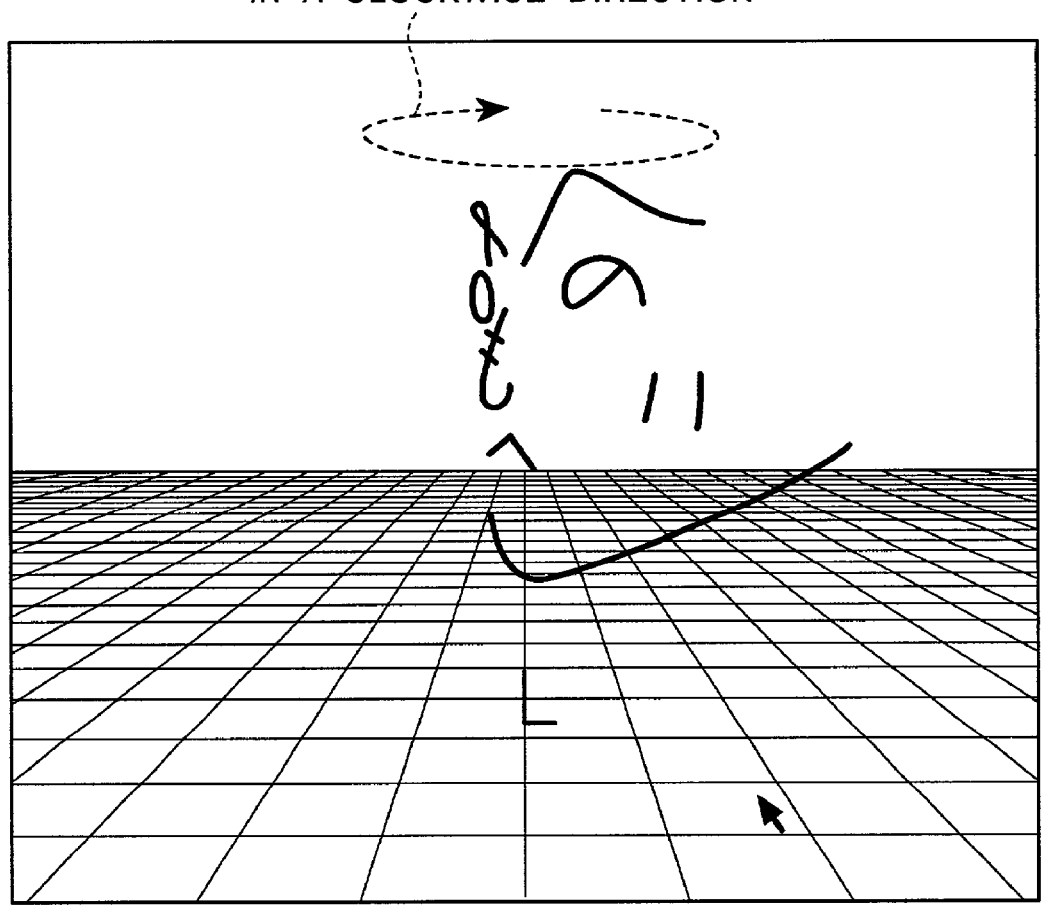
FIG. 11 is a diagram illustrating a manner in which a three-dimensional image is drawn in the community place according to the embodiment of the present invention.
Figure 12:
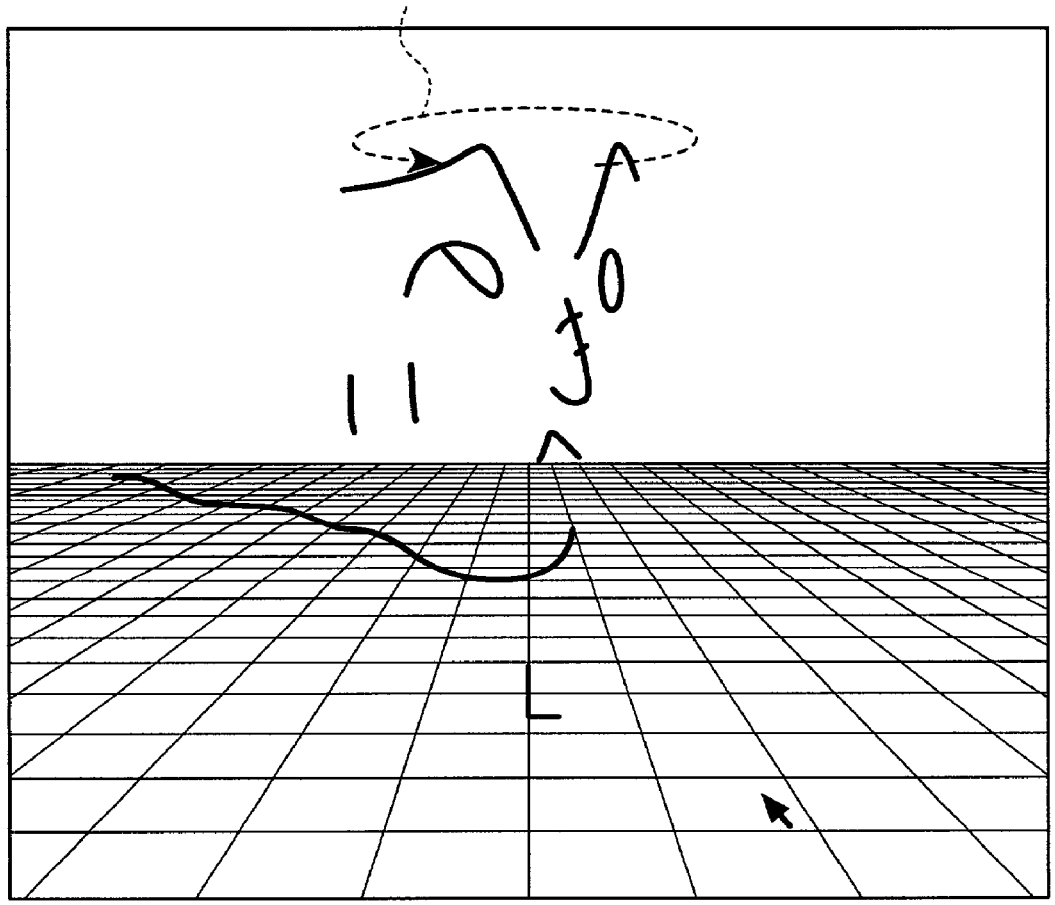
FIG. 12 is a diagram illustrating a manner in which a three-dimensional image is drawn in the community place according to the embodiment of the present invention.

After deleting the canvas, the three-dimensional image may be rotated or the viewpoint may be moved. Such an operation may be performed in a similar manner to the rotation of the canvas or the movement of the viewpoint. FIG. 11 illustrates a manner in which a three-dimensional image is rotated about a z axis in a clockwise direction. FIG. 12 illustrates a manner in which the three-dimensional image is rotated about the z axis in a counterclockwise direction. Information about such a modification of an image is transmitted from the user computer 100 to the CP server 22 in accordance with the VSCP protocol and further to the other user computers from the CP server 22. Thus, the result of the image editing process is reflected in the image displayed on each user computer thereby allowing the same community place to be shared in real time.

Instead of drawing a two-dimensional image on a canvas created on the floor in the three-dimensional space by dragging the mouse, an image file stored on a local disk may be read and pasted on the canvas.

Figure 13:
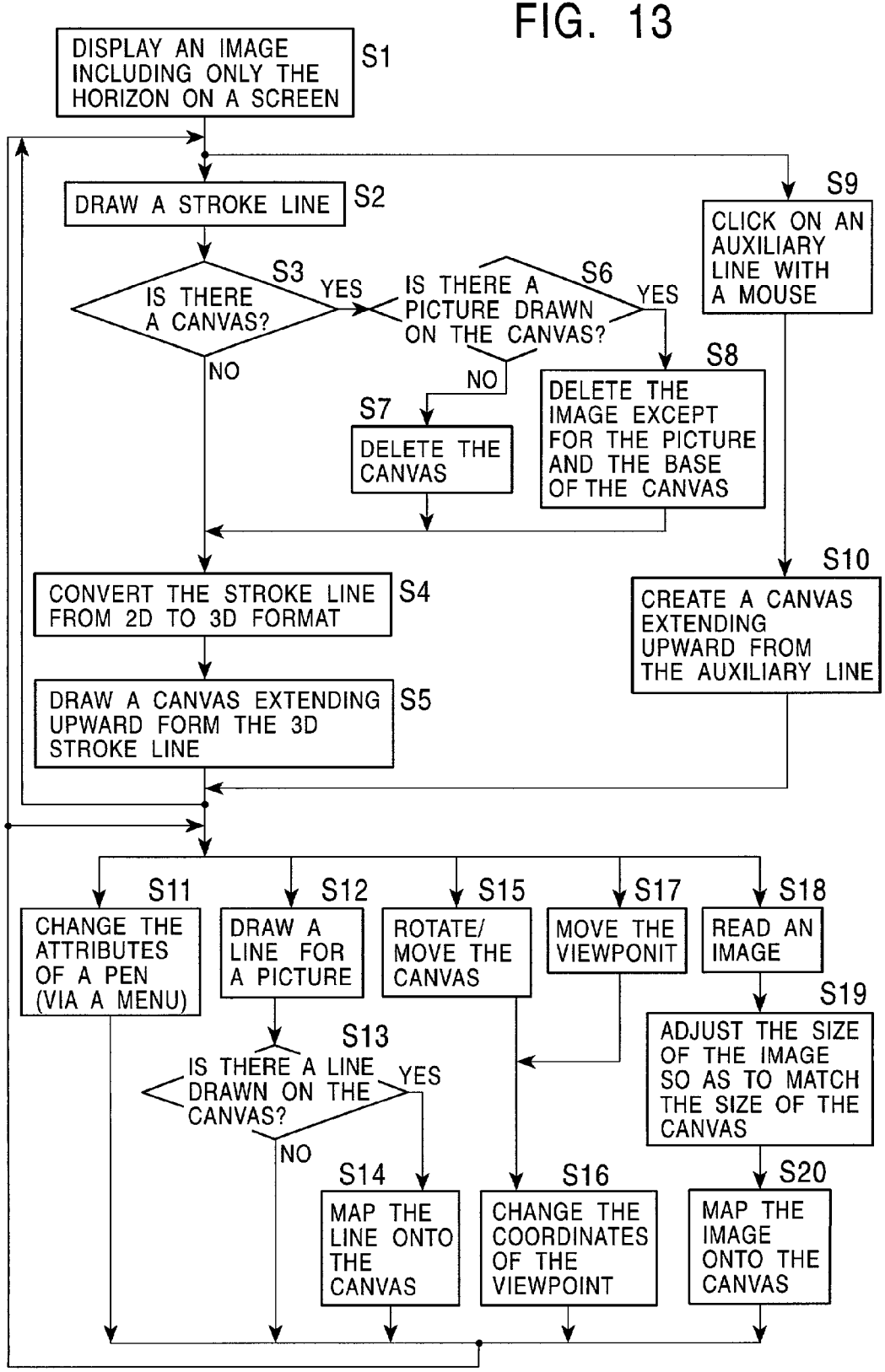
FIG. 13 is a flow chart illustrating a procedure of editing a three-dimensional image.

FIG. 13 is a flow chart illustrating the three-dimensional image editing process. This process may be accomplished by executing a particular program code on a computer system. The image editing process is described below with reference to the flow chart shown in FIG. 13.

First, an image of a three-dimensional space including only the horizon is displayed on a screen (FIG. 6) (step S1). A user draws a desired stroke line on the screen by dragging a mouse 523 (step S2).

In the case where no canvas is displayed on the screen (step S3), a 2D-to-3D conversion is performed upon the stroke line drawn on the ground (step S4) thereby creating a canvas extending upward from the 3D stroke line on the screen (step S5).

In the case where there is an existing canvas on the screen (step S3), if no picture is drawn on the canvas (step S6), the canvas is deleted from the screen (step S7) and the 2D-to-3D conversion is performed upon the stroke line drawn on the ground (step S4) thereby creating a canvas extending upward from the 3D stroke line on the screen (step S5).

In the case where the screen includes an existing canvas on which a picture is drawn (steps S3 and S4), the image is deleted except for the picture and the base of the canvas (auxiliary line) (step S8), and the 2D-to-3D conversion is performed upon the stroke line drawn on the ground (step S4) thereby creating a canvas extending upward from the 3D stroke line on the screen (step S5).

If the auxiliary line, that is, the base of the canvas is clicked by the mouse (step S9), a canvas extending upward from the auxiliary line is created (step S10).

When a canvas is displayed on the screen, the state is in a draw mode in which the user is allowed to draw a picture on the canvas. In the draw mode, the user is allowed to perform various drawing operations such as "changing the pen attribute" (step S11), "drawing a line for a picture" (step S12), "rotating or moving the canvas" (step S15), "moving the viewpoint" (step S17), and "reading an image" (step S18).

Changing the pen attribute (step S11) may be accomplished, for example, via a property window (not shown) which can be opened by clicking a right button of the mouse. The size or the color of the pen point may also be specified.

Drawing a line for a picture (step S12) may be performed by dragging the mouse 23 on the canvas which is currently displayed. In the case where there is a line on the canvas (step S13), the line is mapped onto the canvas (step S14) and is treated as three-dimensional graphics data in the following process.

An operation upon an image such as rotation or movement of the canvas (step S15) and the movement of the viewpoint (step S16) are also allowed. The rotation or movement of the canvas or the movement of the viewpoint can be accomplished by performing a transformation of viewpoint coordinates (step S16) and updating the screen by the result of the transformation.

The user does not necessarily need to draw a picture. Instead, the user may read an image file, for example, from a hard disk (step S18) and may edit the image read from the hard disk. In this case, the size of the image is modified so as to match the size of the canvas (step 19), and the image is mapped onto the canvas (step S20).

A plurality of canvas may be created in a single three-dimensional space, two-dimensional images may be pasted on the respective canvas thereby generating a three-dimensional scene including a plurality of three-dimensional objects.

The technique of creating and editing a three-dimensional image using a canvas is disclosed in Japanese patent application Ser. No. 2000-209731 which has been assigned to the present applicant.

Figure 14:
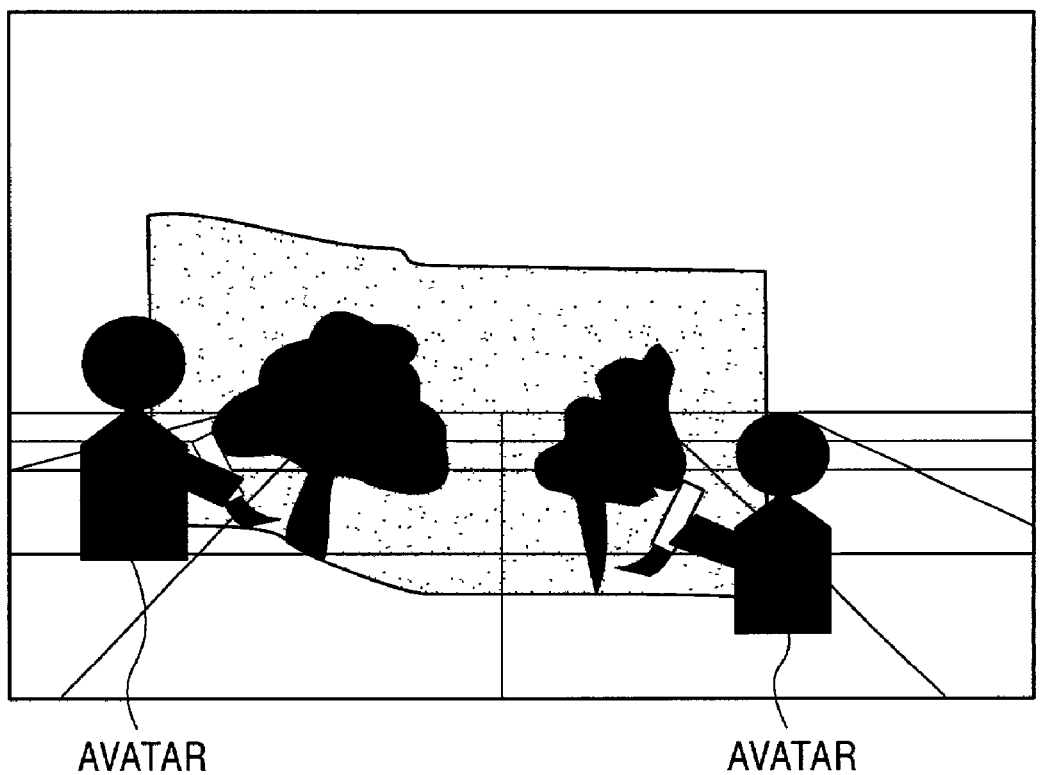
FIG. 14 is a diagram illustrating a manner in which a user (avatar) draws an additional picture on a canvas which has been build by another user.

In the present embodiment, one or more users are allowed to further draw a picture on the canvas on which another user, that is, the avatar of that user has drawn another picture. A plurality of users or avatars may draw a single picture in cooperation (FIG. 14).

4. Dividing the Community Place into Regions and Selling Regions

When an image with high originality or valuable information is described on a canvas or a signboard by a user or his/her avatar, the image or information will attract other users. In such a case, many users or avatars visit the location in the community place where such a canvas or a signboard is disposed. If advertisement information is described on such a signboard which is viewed by many users, a high effective of advertising can be achieved. This means that, in the community place, a location at which an excellent signboard is disposed or a region near that location can be regarded as having a high economic value in analogy to lands in the real world.

The present embodiment provides a service model in which the community place is divided, for example, into an array of rectangular regions, and the regions are assigned to respective users or sold at particular prices.

A user who participates in this service model is given a certain region, and the user is allowed to freely add data within the given region.

For example, a user may build a canvas or a signboard in his/her region and may draw a picture thereon. On the wall of such a canvas or a signboard, not only an image such as a picture or a photograph but another object such as a link to a sound or another three-dimensional space, a link (URL (Uniform Resource Locator)) to a WWW page, a banner (combination of image data and a link for advertising a linked site) may also be pasted. (The specifications of the VRML 2.0 are based on the "Moving World", and the VRML 2.0 provides, in addition to functions provided by VRML 1.0, various functions which allow a three-dimensional object to behave autonomously, an animation to be mapped, audio data to be dealt with, and an interactive expression to be achieved.)

An authorized user having the right to use a region may be allowed to remove a signboard or a canvas which has been placed in the region by another user or to erase an object or link information pasted on the wall surface without permission.

A user who does not have his/her own region (or a user who is present outside his/her own region) is allowed to move from one region to another, or to linked locations. An image may be displayed on the screen in a continuous manner so as to make it possible to visually recognize what data or objects are placed in neighboring regions.

Figure 15:
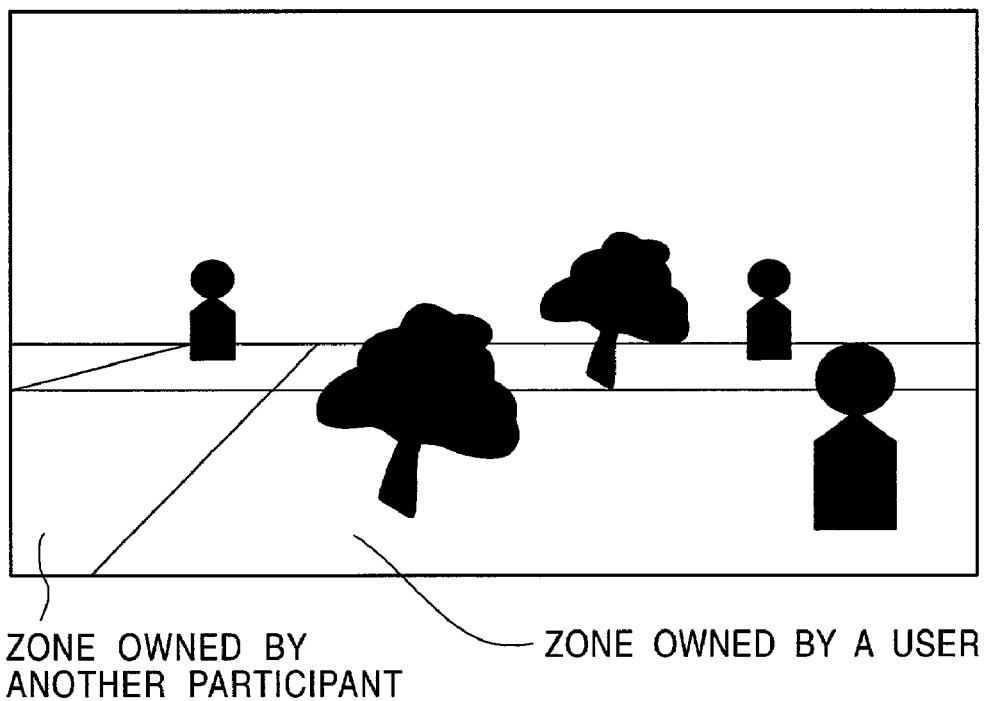
FIG. 15 is a diagram illustrating a manner in which the figure of a user who is present as a visitor in a certain region is displayed in the form of an avatar on the screen of a computer of a user who is present in that region or an adjacent region.

Basically, a user is not allowed to paste data such as an object or link information on a signboard or a canvas in a region owned by another user unless permission is given by the owner of the region. The figure of a user who is present as a visitor in a certain region is displayed in the form of an avatar on the screen of a computer of a user who is present in that region and on the screens of computers of users in adjacent regions. (FIG. 15).

Providing the service frame in the above-described manner causes users to have a competitive spirit who participate in the virtual community space according to the present invention. As a result, users try to build their own regions into a more attractive form. Thus, the service provider who manages the three-dimensional virtual community place does not necessarily have to design a special virtual world, but a three-dimensional virtual space is built into a very attractive form by users. Once a competition has occurred among users, the advance in the virtual community space is accelerated. In other words, the three-dimensional virtual community space in which users live together becomes very realistic, and the chat becomes very enjoyable.

As the community place grows to a greater scale, the difference in attractiveness among regions becomes greater. Thus, a greater number of users will visit a more attractive region, and a user must appear who wants to paste data such as a picture drawn by that user or to put an advertisement in an attractive region. As a result, the attractive region becomes high in economic value, and thus, the concept of virtual ownership of a region is introduced. Furthermore, concepts of "transferring", "selling", and "buying" of the ownership which are common in the real world may be introduced into the virtual community space.

For example, it may be possible to provide a service which allows the ownership of a region in the community place to be sold via auction held on the network.

In such a region auction service, a user first purchases the ownership of a vacant region at a particular price from the service provider who manages the community place. When no data is built in regions, there is no difference in superiority or economic value among regions.

During the process in which users build data such as a building, a signboard, and a canvas in their regions, a certain region becomes very popular (and a large number of users (avatars) visit that region). Thus, differences in economic value appear among regions. A large number of users or avatars will visit also regions near the popular region, and thus the economic values of nearby regions also become high in a similar manner to the real world in which the prices of lands or the like vary.

FIG. 16 is a flow chart illustrating a procedure of selling the ownership of region in the community place via an auction held on the network. Referring to this flow chart, the procedure of performing auction is described below.

First, a service provider puts the right to use a region for sale on a network (step S31).

A user A who wants to own the right to use the region purchases the right to use the region by paying a price to the service provider (step S41). The payment may be performed using electronic money, a credit card, a debit card, or other payment procedures.

After acquiring the right to use the region, the user A can build his/her own world by pasting an object or linked data on a signboard or a canvas in his/her region (step S42).

If the region has become attractive and thus the region becomes high in economic value after repeatedly performing the operation of building data in the region, the user may put the right to use the region for auction at a desired selling price (step S43).

In practice, the auction is started by issuing an auction request including data indicating the proposed selling price of the right to use the region to the service provider. Upon receiving the request, the service provider informs the other users of the proposed selling price for the right to use the region via the network (step S32).

A user may participate in the auction and propose a purchasing price for the right to use the region (step S51).

The service provider compares the proposed selling and purchasing prices and makes a decision so as to satisfy the desires of both the seller and the buyer. More specifically, the user A may sell the right to use the region to a user who has proposed the highest price during an auction period (step S44).

The procedure of transferring the right to use the region is performed via the service provider (step S33). That is, the user A receives a fee for use of the region in exchanging for paying a registration fee and transferring the right to use the region. On the other hand, the user B, who is the purchaser, obtains the right to use the region in exchanging for paying the fee for use of the region to the user A via the service provider (step S52). The payment may be performed using electronic money, a credit card, a debit card, or other payment procedures.

As described above, the right to use a region may be sold by means of auction at a price which may be different from the price at which the region was initially sold. Thus, a user having the right to use a region can sell it only by announcing that a region at a particular location is on sale and proposing a selling price via the network. On the other hand, a user who wants to purchase the region can participate in an auction by proposing a purchasing price.

The auction is held under the control of the serving provider during a particular period until a sales contract has been made. The right to use the region is transferred to a user who has proposed the highest purchasing price during the auction period. Each time a sales contract of a region is achieved, the service provider may receive a registration fee from an original owner or a purchaser of the region thereby making a profit.

Although the conventional virtual community place may provide a service in which a region is sold at a certain price, the virtual community place according to the present invention is different from the conventional one in that a user participating in the virtual community place is allowed to freely build a signboard, a canvas, or a similar element within his/her own region. Thus, the regions in the virtual community space come to have their own features which are different from region to region, and differences in economic value among the regions appear. Therefore, according to the present invention, it is possible to increase the values of regions by increasing the degree of interest or participation of users thereby making it possible to provide a virtual community place service in a more effective manner.

The present invention has been described above in detail with reference to specific embodiments. It will be obvious to those skilled in the art that various modifications and substitutions may be made without departing from the spirit and scope of the present invention. That is, the embodiments have been described above by way of example only and not limitation, and it should be understood that the scope of the invention is indicated by the appended claims.

As can be understood from the above description, the present invention has great advantages. That is, the present invention provides an excellent virtual conversation support system/method for supporting a virtual conversation which is performed in a virtual community having a certain space built on a computer network and in which a plurality of users are allowed to participate.

The present invention also provides an excellent system and method for supporting a virtual conversation in a virtual community space in which a plurality of participating users are allowed to freely build the whole of or a part of the virtual community space.

The present invention also provides an excellent system and method for supporting a virtual conversation in a virtual community space in which a plurality of participating users are allowed to add an element to the virtual community space and also allowed to change or modify an existing element.

In the system and method for supporting a virtual conversation according to the present invention, as described above, users participating in the virtual community place are allowed to freely build a signboard, a canvas, or a similar element within their own regions. Thus, the regions in the virtual community space come to have their own features which are different from region to region, and differences in economic value among the regions appear. Therefore, according to the present invention, it is possible to increase the values of regions by increasing the degree of interest or participation of users thereby making it possible to provide a virtual community place service in a more effective manner.

What is claimed is:

1. A virtual image creating support system for supporting a virtual image in a three-dimensional virtual community space built and provided on a computer network and in which a plurality of users are allowed to participate, said virtual image creating support system comprising:
    wall creating means for creating a wall in the three-dimensional virtual community space from a user-generated stroke line;
    data pasting means for inputting data and pasting the data on the wall; and
    mapping means for mapping said data onto said wall to create a three-dimensional picture in said virtual community space.

2. The image creating support system according to claim 1, wherein the data pasting means pastes, on the canvas, an image, another type of data, or information linked to another information resource.

3. The image creating support system according to claim 1, further comprising means for allowing an avatar of a user logging in the three-dimensional virtual community space to participate in the three-dimensional virtual community space, wherein the data pasting means pastes, on the wall, image data which is input by performing a drawing operation via the avatar of the user.

4. The image creating support system according to claim 1, wherein the wall creating means sets the wall which is created by extending the stroke line in a three-dimensional space including using a mouse.

5. The image creating support system according to claim 1, further comprising image modifying means for modifying an input image in response to an operation performed upon the wall by an user.

6. The image creating support system according to claim 5, wherein the image modifying means rotates and/or moves the image pasted on the wall in response to a rotation/movement operation performed on the wall.

7. The image creating support system according to claim 1, further comprising data pasting control means for permitting or prohibiting a user or an avatar of the user to paste data on the wall which has been set by another user.

8. A virtual image creating support system for supporting a virtual image creating which is performed in a three-dimensional virtual community space built and provided on a computer network and in which a plurality of users are allowed to participate, said image creating support system comprising:
    means for dividing at least a part of the three-dimensional community space into regions;
    means for transferring the right to use a region to a user logging in the three-dimensional virtual community space; and
    wall creating means for creating a wall in the region of the three-dimensional virtual community space from a user-generated stroke line.

9. The virtual image creating support system according to claim 8, further comprising charging means for charging a predetermined price to a user to whom the right to use a region has been transferred.

10. A virtual image creating support system according to claim 8, further comprising:
    means for receiving a request for selling the right to use a region from a user having the right to use the region;
    means for announcing that the right to use the region is on sale;
    means for receiving a request for purchasing the right to the region on sale; and
    means for comparing the selling request and the purchasing request with each other to determine whether the right to use the region should be transferred.

11. The virtual image creating support system according to claim 10, further comprising means for, when the right to use the region is sold, charging a fee or a price to the user who has sold the right to use the region and/or the user who has purchased the right to use the region.

12. The virtual image creating support system according to claim 10, wherein the selling request for selling the right to use the region includes data indicating a proposed selling price and the purchasing request for purchasing the right to use the region includes data indicating a proposed purchasing price, and wherein the means for determining whether the right to use the region should be transferred makes the determination on the basis of a result of comparison between the proposed selling price and the proposed purchasing price.

13. The virtual image creating support method for supporting a virtual image creating which is performed In a three-dimensional virtual community space built and provided on a computer network and in which a plurality of users are allowed to participate, said virtual image creating support method comprising:

a wall creating step for creating a wall in the three-dimensional virtual community space from a user-generated stroke line;

a data pasting step for inputting data and pasting the data on the wall; and a mapping step for mapping said data on to said wall to create a three-dimensional picture in said virtual community space.

14. The virtual image creating support method according to claim 13, wherein in the data pasting step, an image, another type of data, or information linked to another information resource are pasted on the wall.

15. The virtual image creating support method according to claim 13, further comprising a step for allowing an avatar of a user logging in the three-dimensional virtual community space to participate in the three-dimensional virtual community space, wherein in the data pasting step, image data which is input by performing a drawing operation via the avatar of the user is pasted on the wall.

16. The virtual image creating support method according to claim 13, wherein in the wall creating step, the wall is created by extending the stroke line in a three-dimensional space using a mouse.

17. The image creating support method according to claim 13, further comprising an image modifying step for modifying an input image in response to an operation performed upon the wall by a user.

18. The virtual image creating support method according to claim 17, wherein in the image modifying step, the image pasted on the wall is rotated and/or moved in response to a rotation/movement operation performed on the wall.

19. The virtual image creating support method according to claim 13, further comprising a data pasting control step for permitting or prohibiting a user or an avatar of the user to paste data on a wall which has been set by another user.

20. A virtual image creating support method for supporting image creating which is performed in a three-dimensional virtual community space built and provided on a computer network and in which a plurality of users are allowed to participate, said image creating support method comprising:

a step for dividing at least a part of the three-dimensional community space into regions;

a step for transferring the right to use a region to a user logging in the three-dimensional virtual community space; and a wall creating step for creating a wall in the region of the three-dimensional virtual community space from a user-generated stroke line.

21. The virtual image creating support method according to claim 20, further comprising a charging step for charging a predetermined price to a user to whom the right to use a region has been transferred.

22. The virtual image creating support method according to claim 20, further comprising:

a step for receiving a request for selling the right to use a region from a user having the right to use the region;

a step for announcing that the right to use the region is on sale; a step for receiving a request for purchasing the right to use the region on sale; and a step for comparing the selling request and the purchasing request with each other to determine whether the right to use the region should be transferred.

23. The virtual image creating support method according to claim 22, further comprising a step for, when the right to use the region is sold, charging a fee or a price to the user who has sold the right to use the region and/or the user who has purchased the right to use the region.

24. The virtual image creating support method according to claim 22, wherein the selling request for selling the right to use the region includes data indicating a proposed selling price and the purchasing request for purchasing the right to use the region includes data indicating a proposed purchasing price, and wherein in the step for determining whether the right to use the region should be transferred, the determination is made on the basis of a result of comparison between the proposed selling price and the proposed purchasing price.

25. A storage medium including computer software which is physically stored in a computer-readable form on said storage medium so that said computer software is to be executed by a computer system to perform a image creating conversation support process for supporting a virtual image creating which is performed in a three-dimensional virtual community space built and provided on a computer network and in which a plurality of users are allowed to participate, said computer software comprising:

a wall creating step for creating a wall in the three-dimensional virtual community space from a user-generated stroke line;

a data pasting step for inputting data and pasting the data on the wall; and a mapping step for mapping said data onto said wall to create a three-dimensional picture in said virtual community space.

26. A storage medium including computer software which is physically stored in a computer-readable form on said storage medium so that said computer software is to be executed by a computer system to perform a virtual image creating support process for supporting virtual image creating which is performed in a three-dimensional virtual community space built and provided on a computer network and in which a plurality of users are allowed to participate, said computer software comprising:

a step for dividing at least a part of the three-dimensional community space into regions;

a step for transferring the right to use a region to a user logging in the three-dimensional virtual community space; and a wall creating step for creating a wall in the three-dimensional virtual community space from a user-generated stroke line.

* * * * *